(12) United States Patent
Mohabbati et al.

(10) Patent No.: US 10,884,587 B1
(45) Date of Patent: Jan. 5, 2021

(54) SYSTEM FOR GENERATING DYNAMIC CUSTOMIZABLE USER INTERFACES FOR ACCESSING DATA

(71) Applicant: AMAZON TECHNOLOGIES, INC., Seattle, WA (US)

(72) Inventors: Bardia Mohabbati, Seattle, WA (US); Saranya Udomsri, Shoreline, WA (US); Mehdi Sheikholeslami, Seattle, WA (US); Sunil Singh Parihar, Renton, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 87 days.

(21) Appl. No.: 16/213,856

(22) Filed: Dec. 7, 2018

(51) Int. Cl.
*G06F 3/0482* (2013.01)
*G06F 3/0483* (2013.01)
*G06F 16/953* (2019.01)
*G06F 16/957* (2019.01)
*G06F 3/0485* (2013.01)

(52) U.S. Cl.
CPC .......... *G06F 3/0483* (2013.01); *G06F 3/0482* (2013.01); *G06F 3/0485* (2013.01); *G06F 16/953* (2019.01); *G06F 16/9577* (2019.01)

(58) Field of Classification Search
CPC .... G06F 3/0483; G06F 3/0482; G06F 3/0485; G06F 16/9577; G06F 16/953
See application file for complete search history.

(56) References Cited

U.S. PATENT DOCUMENTS

| | | | | |
|---|---|---|---|---|
| 7,860,901 | B2* | 12/2010 | Cheng | G06Q 10/10 707/805 |
| 8,326,835 | B1* | 12/2012 | Munter | G06F 16/904 707/737 |
| 9,477,737 | B1* | 10/2016 | Charyk | G06F 3/0482 |
| 10,331,302 | B1* | 6/2019 | Leyden | G06Q 40/04 |
| 2002/0099598 | A1* | 7/2002 | Eicher, Jr. | G06Q 10/087 705/28 |
| 2005/0256778 | A1* | 11/2005 | Boyd | G06Q 30/06 705/14.43 |
| 2009/0282021 | A1* | 11/2009 | Bennett | G06F 16/334 |

(Continued)

OTHER PUBLICATIONS

Mirovic et al., A Framework for Dynamic Data-Driven User Interfaces, May 21-25, 2018, MIPRO, Whole Document (Year: 2018).*

*Primary Examiner* — Phenuel S Salomon
(74) *Attorney, Agent, or Firm* — Lindauer Law, PLLC

(57) ABSTRACT

Techniques for generation of user interfaces include accessing data indicative of a plurality of values and including a subset of the values in a user interface. The subset may be selected based on user input or the characteristics of the device for which the user interface is generated. Each user interface is associated with a device characteristic, such as the size or shape of a display area or the presence of an audio output device, and the characteristics of the user interface may be determined based in part on the device characteristics. When a request from a user device is received, correspondence between the device characteristics of the user device and the device characteristics associated with the user interfaces is used to determine which interface to provide to the user device. Changes to values in a first user interface are included in other user interfaces accessed using other devices.

20 Claims, 12 Drawing Sheets

(56) References Cited

U.S. PATENT DOCUMENTS

| | | | |
|---|---|---|---|
| 2010/0280912 A1* | 11/2010 | Gopalpur | G06Q 30/0635 |
| | | | 705/22 |
| 2012/0042280 A1* | 2/2012 | Hoffman | H04L 67/306 |
| | | | 715/800 |
| 2012/0137235 A1* | 5/2012 | T S | G06F 8/34 |
| | | | 715/763 |
| 2014/0181087 A1* | 6/2014 | Wu | G06Q 50/01 |
| | | | 707/722 |

* cited by examiner

SYSTEM FOR GENERATING DYNAMIC CUSTOMIZABLE USER INTERFACES FOR ACCESSING DATA

BACKGROUND

Large bodies of data that are designed to be accessed and modified using a large number of webpages or other user interfaces may be cumbersome to access and modify, especially when using devices that have limited input or output capabilities, such as display areas of limited size or audio output devices.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
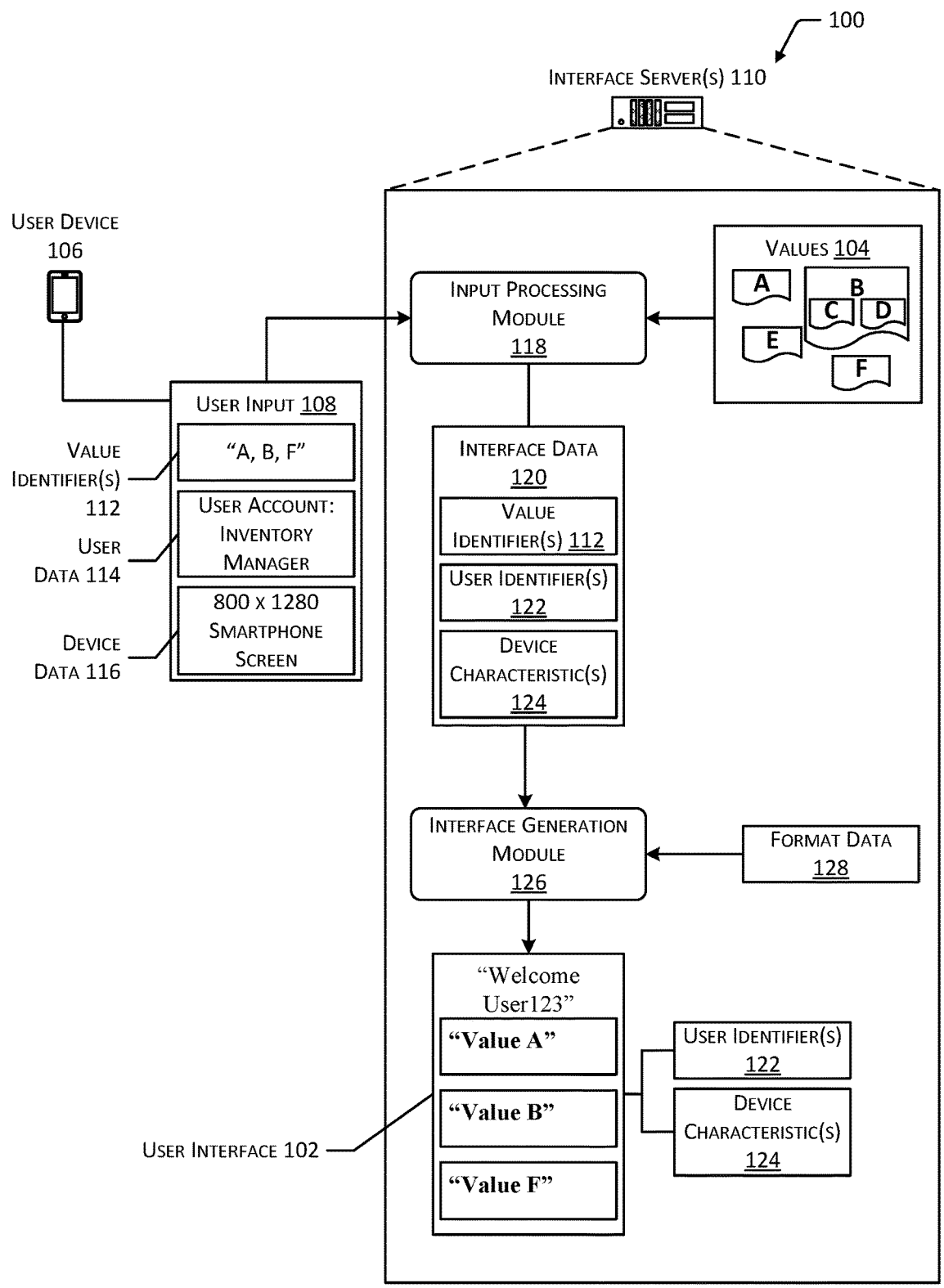
FIG. 1 depicts an implementation of a system for generating user interfaces to present a subset of a plurality of values.

While implementations are described in this disclosure by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used in this disclosure are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include", "including", and "includes" mean "including, but not limited to".

DETAILED DESCRIPTION

Systems that maintain large bodies of data may enable the data to be accessed using multiple webpages or other types of user interfaces. For example, an online store may utilize such a system to enable sellers of items to manage the sale of items using the online store. An online store may include a collection of network-accessible services executed on computer hardware that provides multiple channels through which customers, using a client computing device, may access various catalogs stored in databases to find various products and services available to purchase, lease, and so forth. Continuing the example, numerous data values that may be relevant to a seller of items, such as quantities of inventory for multiple items in various locations, prices of items, counts of items sold, counts of items returned, pending or completed orders, messages from purchasers, revenue amounts, and other such values, sometimes referred to as "performance indicators" may be stored in association with a user account and accessible using webpages. A robust system may include a very large number of webpages, such as thousands or millions of webpages, that may be used to access various values and modify various values. For example, performing a workflow process to modify a value, such as to restock the inventory associated with an item, may include navigation through a large number of webpages. As such, a user that wishes to remain aware of a particular subset of performance indicators or other values may be required to access and navigate numerous webpages to determine the values. Similarly, when a user wishes to modify a value or initiate a workflow process, this may also require accessing and navigating through multiple webpages. In some cases, particular data or particular workflow processes may be difficult to access using some types of devices, such as portable or wearable devices having a display area of limited size or irregular shape, or speaker devices that lack a display and are configured to provide audio output. For example, the limited display size of a mobile device may require several hierarchies of functions to be presented to a user. The user must first locate the correct top-level function and then, within that function, progressively navigate through multiple user interfaces to complete a desired task. Additionally, when navigating using a limited display area, a user must often scroll beyond the visible portion of the display area to view additional content or switch views, sometimes multiple times, to locate desired functionality.

Described in this disclosure are techniques for generating simplified user interfaces that present a subset of values in a format configured for output using a particular device. The subset of values that is output and the format of the values may be customized based on user settings, configurations, or preferences. In some implementations, the values that are output may be customized based on user permissions. For example, based on a user's role within a company, a user account associated with the user may be required to access a first set of values, permitted to access a second set of values, and prevented from access to a third set of values. In some implementations, user input may be received indicating a subset of the values that are of interest to a user. In some cases, the user may also provide user input indicating an order or arrangement of the values that are of interest. For example, a user may provide user input indicating that a quantity of revenue, a count of pending orders, a count of messages from buyers or other users, and a quantity of inventory for an item are performance indicators to be displayed in a user interface. User input may also be used to indicate an arrangement or order of the performance indicators. In other implementations, a subset of the values may be selected based on default values or configurations. For example, a user interface associated with the sale of an item may display a quantity of sales, a quantity of revenue, a quantity of returns, and a quantity of inventory by default, unless user input indicating additional values or removing default values from the user interface is received. In some cases, the default values or configurations may be associated with a particular device type or characteristic. For example, a user interface for output using a browser application associated with a personal computer may be configured to present twenty values, while a user interface for output using a device having a limited display area, such as a wearable computing device having the form factor of a watch, may be configured to present four values.

In some implementations, user input provided to the user interface may be used to access additional values not presented in the user interface or to initiate a workflow process associated with one or more values. For example, a plurality of values may include performance indicators associated with seller data, or other types of values. A user interface presenting a subset of the values may function as a summary associated with the sales of types of items. Values presented in a user interface may be selectable to access additional values or to initiate a workflow process to modify the selected value(s) or another value. In some implementations, a workflow process may be included in a user interface based on characteristics of the device outputting the user interface. For example, a user interface presented using a device having a limited display area may omit an element for initiating a workflow process, while a user interface associated with a larger display area may include such an element. In other implementations, a workflow process may be included in a user interface based on characteristics of the workflow process. For example, a workflow process having a low complexity, such as the addition of a notification or a reminder, may be initiated using an audio device or a device having a small display area, while a workflow process having a larger complexity may be omitted from such devices but included in a user interface associated with a browser application on a personal computer.

In some implementations, a generated user interface may be associated with a device characteristic, such as a size or shape associated with a display area of an output device. For example, user interfaces associated with large display areas may include a larger number of values, while user interfaces associated with display areas having irregular shapes may arrange the values in a manner that corresponds to the shape of a display. When a request to access content is received, a device characteristic associated with the requesting device may be determined. For example, a size, shape, resolution, or other characteristics of a display of a user device may be used to determine a particular user interface that corresponds to the display characteristic. After determining the corresponding user interface, a current value for each of the values included in the user interface may be determined, and the user interface and the associated values may be provided to the user device for presentation. In some implementations, a user interface may include an audio user interface configured for output using a speaker device. For example, a networked speaker device that lacks a display may be configured to audibly output values in response to a user voice command.

In some implementations, a user interface may be associated with a particular user or user account, in addition to or in lieu of association with a device characteristic. For example, a first user associated with a company may be responsible for inventory management and may be provided with a user interface that presents inventory values, a second user associated with the company may be responsible for sales and may be provided with a user interface that presents revenue information, and so forth.

In some cases, a user interface may also be used to configure and present notifications. For example, user input indicating a threshold condition for a particular value may be received, and a notification may be provided to the user interface if a value deviates from the threshold condition. Continuing the example, a user may provide user input causing a notification to be generated if a quantity of returns for an item exceeds a threshold count. As another example, a user may provide user input causing a notification to be generated at a specific time or after passage of a length of time, such as a reminder to respond to a message from a buyer or other user. In other cases, default notifications may be generated based on default threshold conditions. For example, if sale of an item has ceased or been restricted by an online store, a notification associated with this event may be provided to a user interface independent of the values selected by a user for inclusion in the user interface. Notifications generated with regard to a particular value may persist across multiple user interfaces used with multiple devices. For example, user input requesting a notification to be generated at a future time may be received via a user's smartphone, and the notification may be provided at the future time when the user is accessing a desktop computer. As another example, user input dismissing, responding to, or modifying a notification may be received via a wearable computing device, and the dismissal or other modification may be presented when accessing a user interface using a different computing device.

In some implementations, user input indicating a particular value presented within a user interface may be used to access additional values. For example, a user interface may present a subset of values that may be selectable to access additional values. User input may indicate a particular value of the subset. In response to the user input, an output, such as an additional user interface, may be generated that includes other values related to the particular value. In some cases, the other values may include values not presented in the initial user interface. For example, user input selecting a value relating to the total revenue for an item may be received, and in response to the user input, an output presenting related values, such as quantities of sales, quantities of returns, and prices of items may be generated and provided to a user device. In some implementations, user input indicating a particular value within a user interface may be used to initiate a workflow process, such as to modify a value. For example, user input indicating a price of an item may be used to initiate a workflow process to modify the price. As another example, user input indicating the remaining quantity of an item in stock may be used to reorder additional quantities of the item. In some cases, user input indicating a particular value may be used to generate output indicating values that would otherwise be presented in a large number of webpages or to initiate a workflow process that would otherwise be performed by navigating to a large number of webpages.

As one skilled in the art will appreciate in light of this disclosure, certain embodiments may be capable of achieving certain advantages, including some or all of the following: presentation of a user interfaces that include a subset of values selected based on user input or default configurations may enable data normally accessible via a large number of webpages to be viewed in a single display or group of displays, enabling computational tasks to be accomplished more quickly and using fewer computational resources. For example, selection of a particular value may enable additional values normally accessible via multiple webpages to be viewed in a single output. Additionally, selection of a particular value may enable a workflow process that would normally be performed by navigating to multiple webpages to be performed via the user interface. Generation of multiple user interfaces associated with a set of values, which in some cases may be associated with particular user accounts or particular device characteristics, may enable values that are of interest or utility to a particular user to be presented in a quantity and arrangement suitable to the characteristics of an output device, such the size or shape of a display area or the audio output capabilities of a device, simplifying the user interface by maximizing the content presented within a display area.

For example, a simplified user interface may include a customized region of a display area that presents values or other generated data that may be selected to navigate to related information. Use of such a user interface may significantly reduce the number of navigational steps to arrive at a webpage of interest when compared to other methods to navigate to the webpage. In some cases, notifications may be pushed to a browser extension, such as in the form of a popup, presenting a suggested action and including an embedded link for navigation to a card-based sidebar user interface. Each card in the user interface may include embedded links to other cards or pages while presenting a selected set of information suitable for the size of a display area. For example, a more focused set of selected information may be provided when using a mobile device when compared to a larger display area. When a user navigates to a linked page, such as using a link included in a card, the browser extension may modify the page to include additional information, such as links that, when selected, provide additional information in the form of popups or that navigate to additional pages. When information is presented as a popup, a user may obtain this information without navigating away from the underlying webpage. The embedded links may serve as programmatically selected navigation shortcuts to additional cards or webpages, allowing users to bypass the navigational structure of a webpage. The simplified user interface and navigational shortcuts may improve the speed of a user's navigation through a centralized portal, rather than requiring the user to navigate through multiple pages to locate information of interest. This may be particularly useful when using a computing device with a small display area, such as a mobile device, where fewer items may be displayed at one time and navigation through larger quantities of items may be more difficult. Such navigation may also be performed and simplified through the combination of voice commands and card-based user interfaces.

FIG. 1 depicts an implementation of a system 100 for generating user interfaces 102 to present a subset of a plurality of values 104. As discussed previously, values 104 or other generated content may include performance indicators, such as data associated with the sale of items, or other types of data. For example, a value 104 may include any manner of alphanumeric data, audio data, video data, image data, and so forth. In some cases, a particular value 104 may be related to, associated with, or dependent upon one or more other values 104. For example, FIG. 1 depicts six example values 104 ("A" through "F"), in which values "C" and "D" are related to or depend from value "B", while values "A", "E", and "F" are not directly related to the other depicted values 104. While FIG. 1 depicts six example values 104, in other implementations, a system 100 may include any quantity of values 104, including extremely large quantities of values 104. For example, an online store may include a large number of values 104 associated with the sale of items, that may be accessed and manipulated using over one thousand different webpages.

Due to the potentially large number of values 104 that may be stored, a user interface 102 that presents every value 104 may be impractical to generate and output. Additionally, in some cases, particular values 104 may not be of interest or utility to particular users, or may not be suitable for output using particular types of devices. As such, the user interfaces 102 that are generated using the system 100 may be configured to present a selected subset of the values 104. For example, FIG. 1 depicts a user device 106 providing user input 108 indicative of particular values 104 to be included in a user interface 102. One or more interface server(s) 110 may be used to receive the user input 108 and generate one or more user interfaces 102 based on the user input 108. In some implementations, the user input 108 may include alphanumeric data, such as text provided using a keyboard or text selected using a touch interface or mouse device. In other implementations, the user input 108 may include audio data, such as a voice input provided to a microphone. For example, the interface server(s) 110 may store the values 104 or may be in communication with a content server or other type of computing device or data storage medium that stores the values 104. While FIG. 1 depicts a single interface server 110, in other implementations, the interface server(s) 110 may include any number and any type of computing devices including, without limitation, personal computing devices such as desktop or laptop computers, portable computing devices such as smartphones, wearable computing devices, automotive computing devices, servers, set-top boxes, networked audio or video devices, and so forth. Additionally, while FIG. 1 depicts the user device 106 as a single smartphone, the user device 106 may include any number and any type of computing devices including, without limitation, the computing devices described with regard to the interface server(s) 110.

The user input 108 may include one or more value identifiers 112 indicative of particular values 104 for inclusion in a user interface 102. For example, a user responsible for managing inventory for a seller may find values 104 associated with quantities of purchases and returns and quantities of items in stock to be useful, but may not find values 104 associated with revenue amounts to be useful. The user input 108 may include value identifiers 112 that are input by selecting displayed values 104 or by use of an input device, such as a keyboard or microphone, to identify particular values 104. For example, FIG. 1 depicts value identifiers 112 that indicate the values "A", "B", and "F" for inclusion in a user interface 102. Other values 104 (e.g., "C", "D", and "E") may not be included in a user interface 102 that is generated based on the user input 108, but may be accessible using the user interface 102 or by providing additional user input 108.

The user input 108 may also include user data 114 indicative of a user, user account, or user device 106 accessing the system 100. In other implementations, the user data 114 may be determined from the user device 106 or another computing device that stores the user data 114 in response to receipt of the user input 108 that includes the value identifiers 112. For example, the user data 114 may indicate demographic or geographic information regarding a user account, such as a user's position within a company (e.g., "Inventory Manager"), or an identifier of a specific user or user account, such as a name or account number. A generated user interface 102 may be configured for output to specific users or types of user accounts. For example, a user interface 102 generated by a particular user may be output when that particular user provides a request to access particular values 104, while a different user interface 102 may be provided if a request associated with a different user account is received. As another example, a user interface 102 that presents values 104 associated with inventory may be presented in response to requests associated with user data 114 that indicates a user account associated with inventory.

The user input 108 may also include device data 116 indicative of a particular device, device type, or characteristic of a device for use accessing a user interface 102. In some implementations, the device data 116 may be determined based on the user device 106 providing the user input 108. In other implementations, the user input 108 may indicate a particular device, characteristic, or device type, which may be associated with the user device 106 or with a different computing device. For example, the user input 108 provided by the user device 106 may be used to generate a user interface 102 for output using a different computing device. Device data 116 may indicate one or more characteristics of a computing device, such as the shape, size, resolution, or other characteristics of a display area, the characteristics of an audio output device, and so forth. In some cases, device data 116 may indicate a particular device or type of device, and characteristics of the device may be determined by the interface server(s) 110 or another computing device storing data indicating the characteristics of one or more devices. For example, FIG. 1 depicts example device data 116 indicating a display size of 800×1280 pixels for a smartphone screen. Other types of user devices 106 may include other characteristics. A generated user interface 102 may be configured for output to specific devices, types of devices, or devices having specific characteristics. For example, a first user interface 102 may be configured for output to a small, round display associated with a wearable computing device having the form factor of a watch, while a second user interface 102 may be configured for output to the rectangular display of a desktop computer, and a third user interface 102 may be configured for audio output using a networked speaker device. Controlling the particular user interface 102 that is output based on device data 116 may improve user access to each presented value 104. For example, output of the third user interface 102 using a device that lacks speakers or that includes speakers associated with a poor range of frequencies or a poor volume may be unsuitable. Similarly, output of the second user interface 102 to a device having a limited display area or an irregular display shape may prevent visibility of portions of the data presented in the user interface 102.

An input processing module 118 associated with the interface server(s) 110 may receive the user input 108 and generate interface data 120 based on the value identifiers 112, the user data 114, and the device data 116. For example, the input processing module 118 may determine correspondence between the values 104 and the value identifiers 112 of the user input 108, such as to determine whether the user input 108 corresponds to existing values 104. If the value identifiers 112 correspond to values 104, the interface data 120 may include an indication of the value identifiers 112. In some implementations, the input processing module 118 may be configured to generate or determine one or more user identifiers 122 associated with the user data 114. For example, the input processing module 118 may generate or assign a user identifier 122 indicative of a particular user account or account characteristic based on the user data 114 of the user input 108. Continuing the example, a particular user identifier 122 may indicate user accounts associated with inventory management. The input processing module 118 may also determine device characteristics 124 based on the device data 116. For example, device data 116 may include identifiers indicative of a particular device, device type, or device components, while the device characteristics 124 determined based on the device data 116 may include a size or shape of a display area, characteristics of an audio output device, availability of a touch sensor as an input device, and so forth. In some implementations, the input processing module 118 may be configured to determine user data 114 or device data 116 from the user device 106 or one or more other computing devices, such as in cases where the user input 108, itself, does not indicate the user data 114 or device data 116.

An interface generation module 126 associated with the interface server(s) 110 may generate user interfaces 102 based on the interface data 120 and format data 128 indicative of counts of values 104 and other elements and arrangements of values 104 and elements based on the user input 108 and device characteristics 124. For example, format data 128 may associate a particular device characteristic 124, such as a size and shape of a display area, with a corresponding count and arrangement of values 104 and other elements. In some implementations, format data 128 may associate device characteristics 124 with particular user interface elements, such as workflow elements for initiation of a workflow process. For example, user interfaces 102 presented using user devices 106 having a limited display area may lack elements for initiating workflow processes or may include elements for initiating workflow processes having a limited complexity less than a threshold value. Based on the value identifiers 112 and format data 128, the interface generation module 126 may generate a user interface 102 that presents the values 104 indicated by the value identifiers 112. The user interface 102 may be stored in association with one or more user identifiers 122 or device characteristics 124. For example, if a request to access a user interface 102 associated with a particular user identifier 122 and device characteristic 124 is received, a particular user interface 102, from among a plurality of user interfaces 102, that is associated with a corresponding user identifier 122 and device characteristic 124 may be determined and provided to the requesting device.

While FIG. 1 depicts a single user interface 102 being generated in response to a single user input 108, any number of user interfaces 102 may be generated in a similar manner, each user interface 102 including a particular set of value identifiers 112 and being stored in association with particular user identifiers 122 or device characteristics 124. Additionally, while FIG. 1 depicts a user interface 102 that is generated based on user input 108, in other implementations, a user interface 102 may be generated using default sets of value identifiers 112. For example, a particular set of value identifiers 112, such as value identifiers 112 associated with sales figures, may be associated with user data 114 indicative of user accounts associated with sales of items. As such, a user interface 102 that presents values 104 associated with sales figures may be provided when a request is received from a user account associated with sales of items. As another example, a default set of value identifiers 112 may be used to determine the values 104 presented in a user interface 102, and the particular count or arrangement of the values 104 that correspond to the default set may be determined based on the device characteristics 124 for a device requesting to access the values 104.

Figure 2:
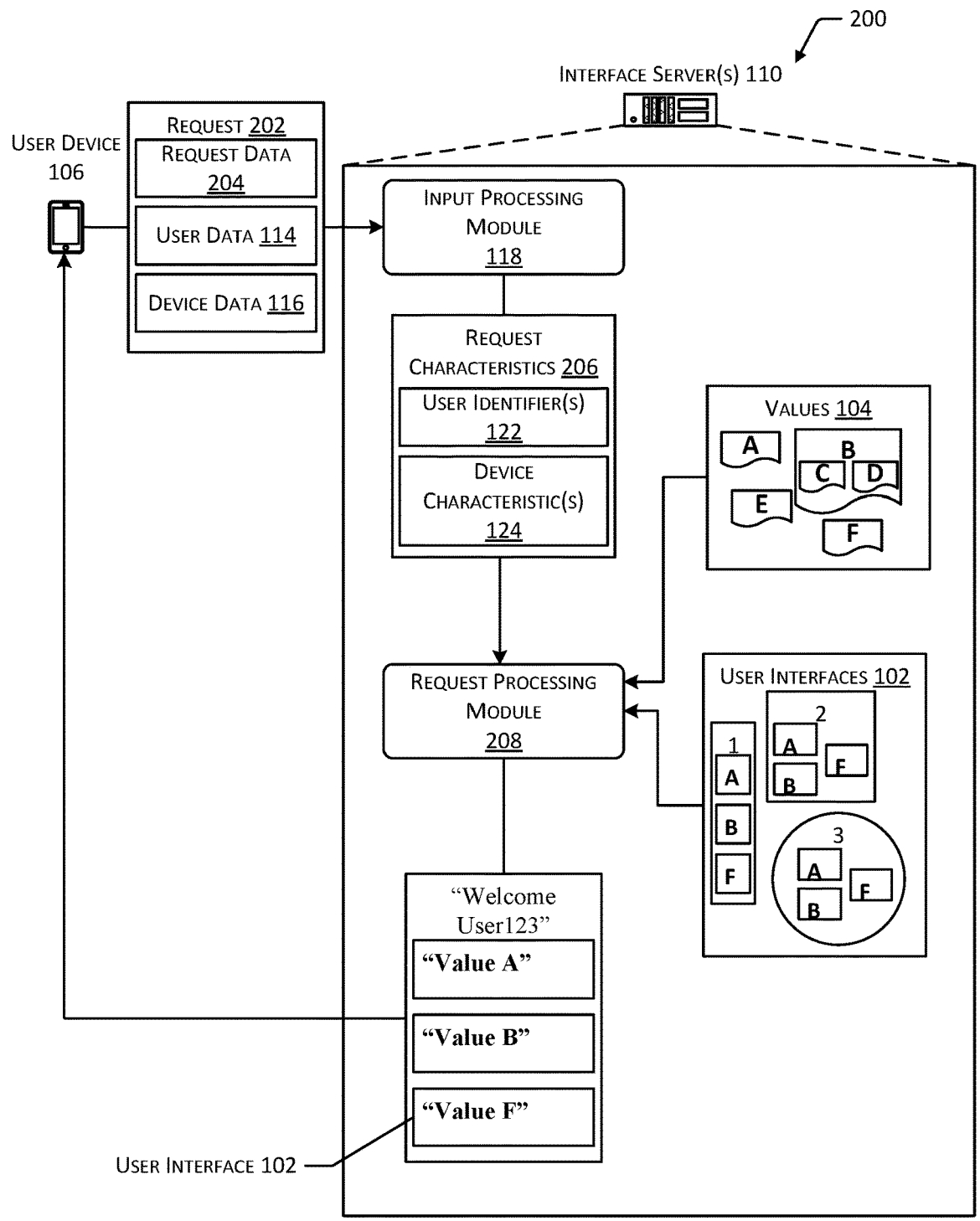
FIG. 2 depicts an implementation of a system for determining a user interface to provide to a user device for presenting a subset of a plurality of values.

FIG. 2 depicts an implementation of a system 200 for determining a user interface 102 to provide to a user device 106 for presenting a subset of a plurality of values 104. As described with regard to FIG. 1, a user interface 102 may be generated based on one or more of user input 108, user data 114, or device data 116. In some implementations, a user interface 102 may also be generated based on default values 104 or configurations. While FIG. 1 depicts a single example user interface 102, any number of user interfaces 102 may be generated using the techniques described herein. Different user interfaces 102 may be configured for output using different types of displays, audio output devices, and so forth. Additionally, different user interfaces 102 may be configured for output to different user accounts or different types of user accounts. Further, different user interfaces 102 may be configured to present different sets of values 104. For example, FIG. 2 depicts a system 200 storing multiple user interfaces 102 (e.g., user interfaces "1" through "3"). Continuing the example, a first user interface 102 (e.g., "1") may be configured for output using a rectangular display, a second user interface 102 (e.g., "2") may be configured for output using a square display, and a third user interface 102 (e.g., "3") may be configure for output using a round display. Other user interfaces 102 may be configured for output using other types of devices. For example, a user interface 102 may include an audio user interface 102 for output using a networked speaker device. As another example, a user interface 102 may be accessible as a browser extension. For example, a plug-in or similar type of data may be used to add functionality to an existing browser application, such as buttons, display areas, mouse-over features, and so forth, such that a user interface 102 may be accessed by selecting, viewing, or placing a cursor within proximity of a portion of the output associated with a browser application. While FIG. 2 depicts each of the example user interfaces 102 presenting the same set of values 104, in other implementations, different user interfaces 102 may present different values 104. Additionally, as described with regard to FIG. 1, each user interface 102 may be stored in association with corresponding user identifiers 122 or device characteristics 124 that indicate the particular user accounts, user devices 106, account types, or device responsive to which the user interface 102 may be provided to a user device 106 for output.

Specifically, a user device 106 may provide a request 202 to access content to the interface server(s) 110, or another computing device that stores or is configured to access the user interfaces 102. The request 202 may include request data 204 indicative of specific content (e.g., values 104 or user interfaces 102) to be accessed. The request 202 may also be associated with user data 114 indicative of a user, user account, or user device 106 accessing the system 200. In some implementations, the user data 114 may not be indicated in the request 202 and may be determined separately, such as in response to receipt of the request 202. The request 202 may additionally be associated with device data 116 indicative of a particular device, device type, or characteristic of a device providing the request 202. In other implementations, a user device 106 may provide a request 202 configured to cause a user interface 102 to be provided to a different computing device. For example, a user may provide a voice command to a networked speaker to cause a user interface 102 to be provided to a desktop computer or networked television in communication with the speaker.

The input processing module 118, or another module associated with a computing device that receives the request 202, may determine request characteristics 206 based on one or more of the user data 114 or device data 116. Request characteristics 206 may include user identifiers 122 indicative of a user device 106, user account, or particular user, as described with regard to FIG. 1. Request characteristics 206 may also include device characteristics 124 indicative of a characteristic of the user device 106 from which the request 202 is received, or another computing device indicated in the request 202. Example device characteristics 124 may include the size, shape, presence, or absence of display output devices or audio output devices associated with a computing device.

A request processing module 208 associated with the interface server(s) 110, or another computing device configured to access the user interfaces 102, may determine a particular user interface 102 that corresponds to the request characteristics 206. As described with regard to FIG. 1, each user interface 102 may be stored in association with one or more user identifiers 122 or device characteristics 124. When a request 202 is received, the user identifiers 122 or device characteristics 124 associated with the request 202 may correspond to the user identifiers 122 or device characteristics 124 associated with a user interface 102. Based on this correspondence, the user interface 102 that corresponds to the request characteristics 206 may be provided to the user device 106. For example, a user device 106 having a display area with a shape and dimensions that correspond to a particular user interface 102 may be provided with the corresponding user interface 102 to maximize the use of the display area of the user device 106.

The request processing module 208 may also access the values 104 associated with the user interface 102 to determine a current status of the values 104 to be included in the user interface 102. For example, performance indicators and other types of values 104 may change as items are sold, returned, and so forth. As such, the current status of each value 104 may differ each time that a user interface 102 is accessed. The request processing module 208 may therefore determine the current status of each value 104 to be presented in a user interface 102 in response to the request 202.

Figure 3:
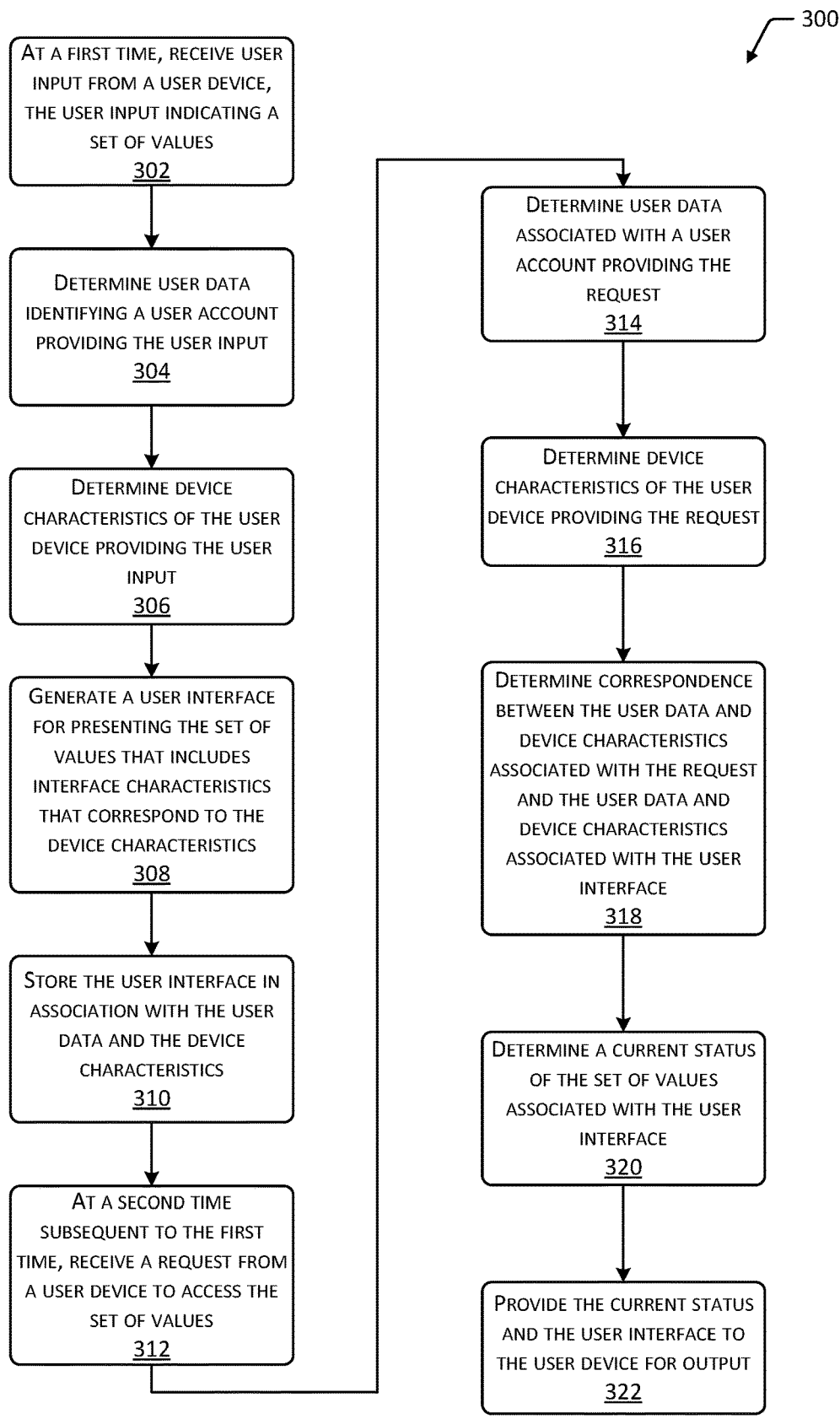
FIG. 3 is a flow diagram depicting a method for generating a user interface to present a set of values and providing the user interface to a corresponding user device in response to a request.

FIG. 3 is a flow diagram 300 depicting a method for generating a user interface 102 to present a set of values 104 and providing the user interface 102 to a corresponding user device 106 in response to a request 202. At 302, at a first time, user input 108 may be received from a user device 106. The user input 108 may indicate a set of values 104. For example, a large quantity of values 104 may be accessible using multiple webpages or other types of interfaces. However, only a subset of the values 104 may be of interest or utility to a particular user. As such, user input 108 may include one or more value identifiers 112 that indicate one or more of the values 104. User input 108 may include selection of values 104 from a list, grid, or other type of interface, the input of text, audio, or gestures indicating values 104 by name, or other types of input that may be used to select particular values 104 or differentiate selected values 104 from other values 104. In other implementations, a set of default values 104 may be determined in lieu of user input 108, and block 302 may be omitted. For example, a set of default values 104 associated with particular user accounts or device characteristics 124 may be determined rather than receiving value identifiers 112 from a user device 106.

At 304, user data 114 identifying a user account providing the user input 108 may be determined. For example, when user input 108 is received, a user account or other information associated with the user device 106 or with the user input 108 may be determined. In other implementations, the user input 108 may indicate user data 114, such as by indicating a particular user, user account, account characteristics, and so forth. In some cases, the user data 114 may indicate a user account associated with the source of the user input 108. For example, a user may provide user input 108 to generate a user interface 102 for future use by the user. In other implementations, user data 114 may indicate a user account that is not associated with the source of the user input 108. For example, a first user, such as an administrator, may provide user input 108 to generate user interfaces 102 for use by a second user, based on the role of the second user within a company. In some implementations, user data 114 may indicate permissions associated with a user account. For example, a particular user account may be required to include certain values 104 in a user interface 102, permitted to include other values 104, and prohibited from access to still other values 104. When a user interface 102 is generated and stored in association with user data 114, the user data 114 may indicate one or more of the user account, user customizations or preferences indicated via user input 108, or permissions associated with the user account.

At 306, device characteristics 124 of the user device 106 providing the user input 108 may be determined. For example, when user input 108 is received, data indicative of the particular user device 106 providing the user input 108, a device type, hardware or software components of the user device 106, and so forth may be determined. In other implementations, the user input 108 may indicate device characteristics 124. In still other implementations, the user input 108 may identify a device, device type, or device characteristics 124 of a device that is not associated with the source of the user input 108. For example, a user may use a first user device 106 to provide user input 108 for generating a user interface 102 to be presented using a second user device 106. Example device characteristics may include characteristics of a display, such as dimensions, a shape, resolution, color capabilities, and so forth. Example device characteristics 124 may also include characteristics of a speaker or other type of audio output device, such as usable frequencies, signal strengths, audio data rates, and so forth. Example device characteristics 124 may further include input devices associated with a computing device. For example, a computing device that includes a touchscreen display may be provided with a user interface 102 having an arrangement that accounts for use of the touchscreen to provide input, while a user interface 102 provided to a computing device that uses an input device separate from the display may have a different arrangement of elements. While FIG. 3 depicts block 306 subsequent to block 304, in other implementations, device data 116 may be determined prior to determining user data 114 or concurrent with determining user data 114.

At 308, a user interface 102 for presenting the set of values 104 may be generated. The user interface 102 may include interface characteristics that correspond to the device characteristics 124. For example, interface characteristics may include a count or arrangement of values 104 or other elements based on the dimensions or shape of a display area. As described with regard to FIG. 1, in some implementations, format data 128 that associates device characteristics 124, such as a size and shape of a display area, with a corresponding count and arrangement of values 104 and other elements, may be used to generate a user interface 102 that corresponds to the characteristics of the user device 106. For example, a user interface 102 that corresponds to a small, round display area for a wearable computing device having the form factor of a watch may have a smaller count of elements and a different arrangement of elements than a user interface 102 that corresponds to a large, rectangular display of a laptop computer.

At 310, the user interface 102 may be stored in association with the corresponding user data 114 and the device characteristics 124. For example, when a subsequent request 202 to access content is received, a particular user interface 102 from a set of multiple user interfaces 102 may be selected for use based on correspondence between the user data 114 and device characteristics 124 associated with the user interface 102 and the user data 114 and device characteristics 124 associated with the request 202.

At 312, at a second time, subsequent to the first time, a request 202 from a user device 106 to access the set of values 104 may be received. As described with regard to FIG. 2, a request 202 may be associated with request data 204 indicative of specific content to be accessed, user data 114 indicative of a user or user account associated with the request 202, and device data 116 indicative of a device to be used to present a user interface 102. As such, at 314, user data 114 associated with a user account providing the request 202 may be determined. At 316, device characteristics 124 of the user device 106 providing the request 202 may be determined. In other implementations, the request 202 may indicate a computing device other than the user device 106 providing the request 202. For example, a first computing device may be used to provide a request 202 for a user interface 102 to be output using a second computing device.

At 318, correspondence between the user data 114 and device characteristics 124 associated with the request 202 and the user data 114 and device characteristics 124 associated with the user interface 102 may be determined. This correspondence may indicate that the user interface 102 has dimensions, a count of elements, an arrangement of elements, or other features that may fit within the display area of a device, or other features that correspond to the features of the user device 106 used to output the user interface 102. The correspondence may also indicate that the user data 114 associated with the request 202 is associated with sufficient permissions or other credentials to access the user interface 102 and the associated values 104, and that the values 104 and format associated with the user interface 102 correspond to the user data 114 associated with the request 202.

At 320, a current status of the set of values 104 associated with the user interface 102 may be determined. For example, the status for each value 104 included in the user interface 102 may change over time, and when a user interface 102 is populated with values 104, the current status of each value 104 may first be determined and used to ensure that accurate data is presented to a user. In cases where a current status for a value 104 may not be determined, such as if access to a network is not available or if a particular value 104 is not able to be accessed, a previous (e.g., cached) status of the value 104 may be presented. In such cases, the user interface 102 may include an indication that the status of the value 104 may not be current. At 322, the current statuses for each value 104 and the user interface 102 may be provided to a user device 106 for output.

Figure 4:
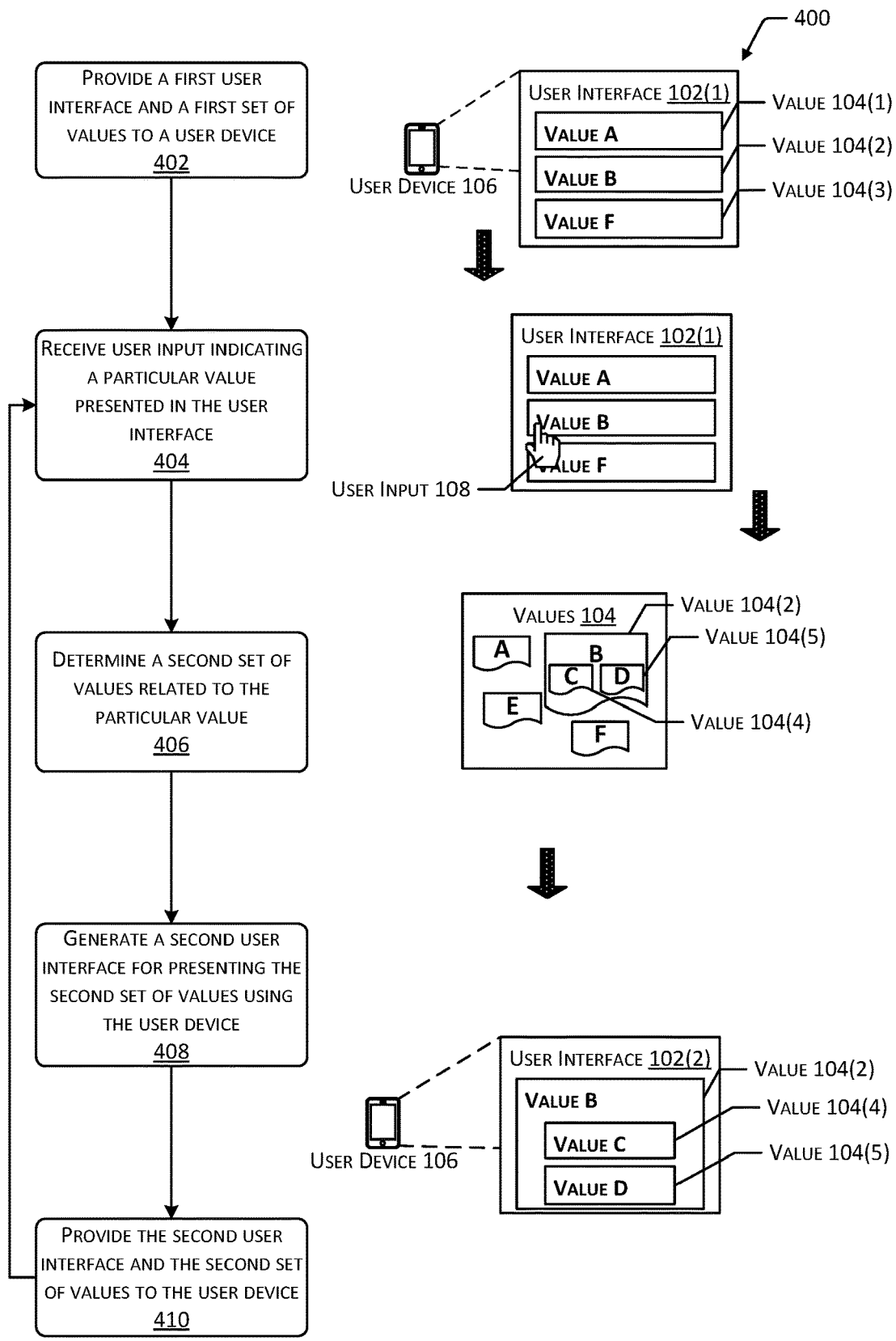
FIG. 4 illustrates a method for providing access to additional values in response to user input associated with a user interface.

FIG. 4 illustrates a method 400 for providing access to additional values 104 in response to user input 108 associated with a user interface 102. At 402, a first user interface 102(1) and a first set of values 104 may be provided to a user device 106. As described with regard to FIGS. 1-3, in response to a request 202 to access content, a user interface 102(1) that corresponds to characteristics of the user device 106, such as display dimensions, a display shape, audio output characteristics, and so forth, may be provided to the user device 106. The user interface 102 may include a count of elements or arrangement of elements that corresponds to the display dimensions, display shape, or audio output characteristics of the user device 106. For example, if the user device 106 is a mobile device having a rectangular display area of limited size, the user interface 102 may include a small count of elements arranged in a generally rectangular layout. As one example, FIG. 4 illustrates the user device 106 as a smartphone and the first user interface 102(1) having a generally rectangular shape that presents three values 104 arranged in a generally vertical orientation. Specifically, a first value 104(1) ("A") is shown vertically above a second value 104(2) ("B"), which is shown vertically above a third value 104(3) ("F"). In other implementations, other types of user interfaces 102 may be presented based on the device characteristics 124 of the user device 106. For example, a user interface 102 may include an audio user interface 102 that is output using a speaker device.

At 404, user input 108 indicating a particular value 104(2) presented in the user interface 102 may be received. For example, using an input device, such as a touch sensor, mouse device, keyboard, and so forth, a user may provide user input 108 selecting or indicating a particular value 104(2). Continuing the example, a particular value 104(2) may represent a general category or type of value 104, and one or more other values may be associated with, related to, or dependent on the selected value 104(2). As such, selection of a particular value 104(2) may be used to access additional values 104. In other implementations, user input 108 may include other types of data, such as audio data provided using a microphone, image data or video data provided using a camera, motion data or position data detected using one or more device sensors, and so forth.

At 406, a second set of values 104 related to the particular value 104(2) may be determined. For example, FIG. 4 depicts a fourth value 104(4) and a fifth value 104(5) that are related to the second value 104(2).

At 408, a second user interface 102(2) for presenting the second set of values 104 using the user device 106 may be generated. The second user interface 102(2) may include characteristics that correspond to the device characteristics 124 of the user device 106. For example, a count or arrangement of elements in the second user interface 102(2) may correspond to the display dimensions, display shape, audio output characteristics, or other characteristics of the user device 106.

At 410, the second user interface 102(2) and the second set of values 104 may be provided to the user device 106. For example, FIG. 4 depicts the second user interface 102(2) presenting the second value 104(2), fourth value 104(4), and fifth value 104(5) in a generally vertical orientation. In a similar manner, a user may provide user input 108 to the second user interface 102(2) to access additional values 104, such as by selecting a displayed value 104, to navigate to the previous user interface 102(1), and so forth. For example, in response to the second user interface 102(2), blocks 404 through 410 may be repeated if user input 108 selecting a value 104 presented in the second user interface 102(2) is received.

Figure 5:
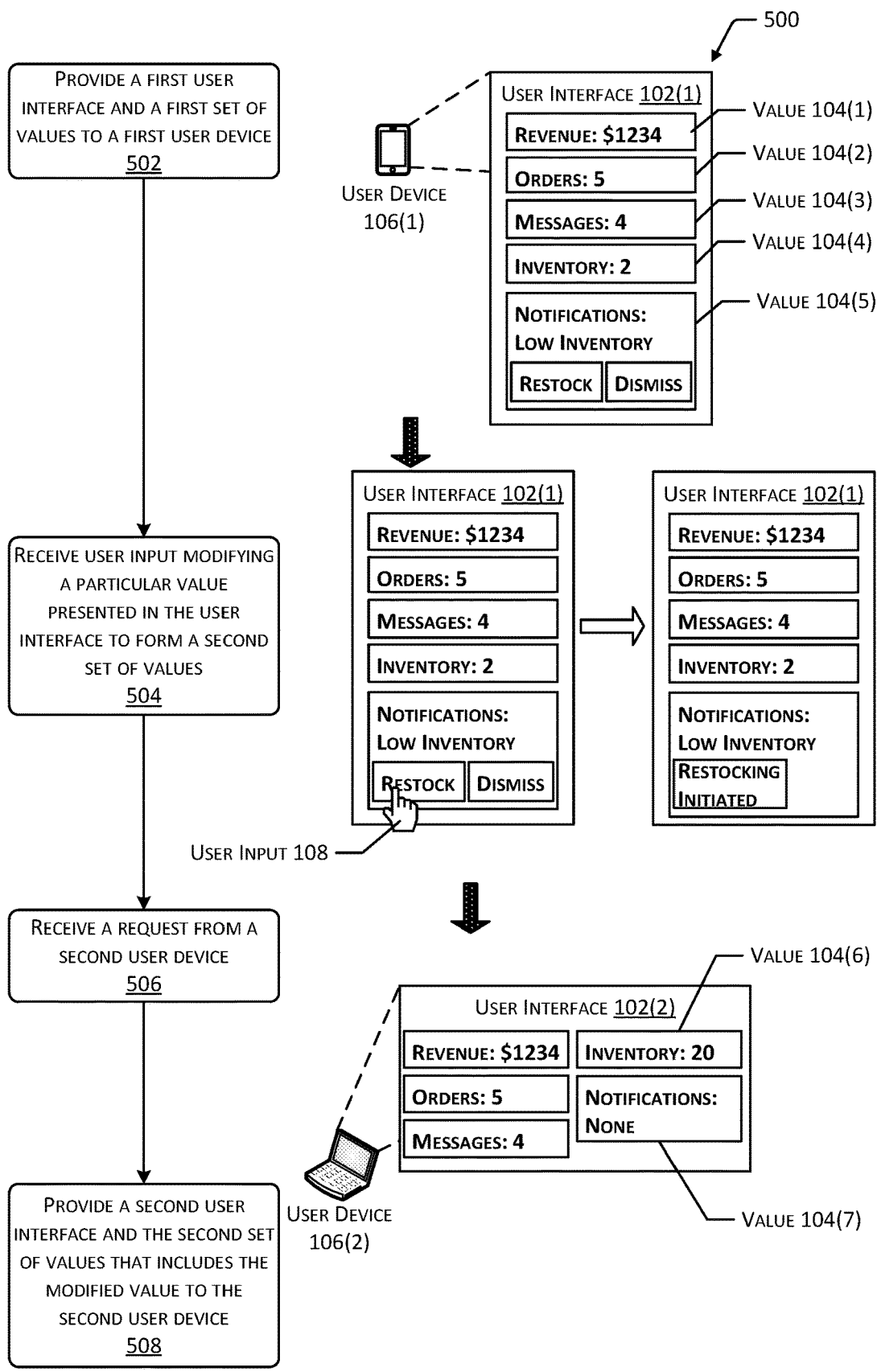
FIG. 5 illustrates a method for modifying values within a first user interface based on user input and including the modified values in a second user interface.

FIG. 5 illustrates a method 500 for modifying values 104 within a first user interface 102(1) based on user input 108 and including the modified values 104 in a second user interface 102(2). At 502, a first user interface 102(1) and a first set of values 104 may be provided to a first user device 106(1). FIG. 5 depicts the user device 106(1) as a smartphone having a generally small display area with the shape of a vertical rectangle and the first user interface 102(1) including five values 104 arranged in a generally vertical orientation. Each of the example values 104 show in FIG. 5 includes a performance indicator associated with sales of one or more types of items. For example, a first value 104(1) is depicted as a quantity of revenue, a second value 104(2) as a count of orders, a third value 104(3) as a count of messages, a fourth value 104(4) as a count of inventory in stock, and a fifth value 104(5) as a notification. Notifications may be provided to a user interface 102(1) when a particular value 104 deviates from a threshold condition. For example, in response to the quantity of inventory indicated in the fourth value 104(4) being less than a threshold value, a notification indicating "Low Inventory" may be generated and provided to the user interface 102(1). Threshold values may include default values or values generated based on user input 108. In some implementations, one or more values 104 may be configured to receive user input 108 to initiate a workflow process. For example, the fifth value 104(5) is shown including a first button to initiate a workflow process to restock inventory and a second button to dismiss the notification.

At 504, user input 108 modifying a particular value 104(5) presented in the user interface 102 may be received, to form a second set of values 104. For example, user input 108 interacting with the fifth value 104(5), such as by selecting the "restock" button, may cause modification of the fifth value 104(5) by causing the notification "Low Inventory" to be removed. Additionally, initiating a workflow process to restock inventory may cause the value 104(4) indicating the quantity of inventory to be modified. In other implementations, user input 108 to dismiss a notification may be used to remove the value 104 associated with the notification without initiating a process to affect other values 104. In still other implementations, user input 108 may be used to temporarily dismiss a notification (e.g., "snooze" the notification), set a date or time upon which a dismissed notification or a different notification may be provided, and so forth. In some cases, the user interface 102(1) may be modified to indicate that the user input 108 has been received, a value 104 has been modified, a workflow process has been initiated, and so forth. For example, in response to user input 108 selecting a "Restock" button to initiate a workflow process to restock inventory, the message "Restocking Initiated" may be output to the user interface 102(1).

At 506, a request 202 from a second user device 106(2) may be received. FIG. 5 depicts the second user device 106(2) as a laptop computer having a generally large display area with the shape of a horizontal rectangle. The request 202 may indicate the same content (e.g., performance indicators) as those presented in the first user interface 102(1). However, between the time that the first user interface 102(1) and the second user interface 102(2) is presented, one or more values 104 may have changed, such as due to the user input 108 interacting with the fifth value 104(5). In other implementations, input from other users may cause one or more values 104 to change. As such, generation of the second user interface 102(2) may include determining a current status of each value 104 presented in the user interface 102(2), as described with regard to FIG. 3. Generation of the second user interface 102(2) may also include determining the device characteristics 124 of the second user device 106(2), such as the dimensions or shape of the associated display area.

At 508, a second user interface 102(2) and the second set of values 104 may be provided to the second user device 106(2). FIG. 5 depicts the second user interface 102(2) presenting five values 104 that are arranged in the format of a horizontal rectangle that corresponds to the shape of the display area for the second user device 106(2). Due to the modification of the values 104 described at 504, the second user interface 102(2) presents a sixth value 104(6) in place of the modified fourth value 104(4) and a seventh value 104(7) in place of the modified fifth value 104(5). For example, after interacting with a notification indicated in the fifth value 104(5), the fifth value 104(5) may be replaced with the seventh value 104(7) indicating "Notifications: None". Continuing the example, after initiating a workflow process to restock inventory of an item, the fourth value 104(4) of "Inventory: 2" may be replaced with the sixth value 104(6) of "Inventory: 20".

Figure 6:
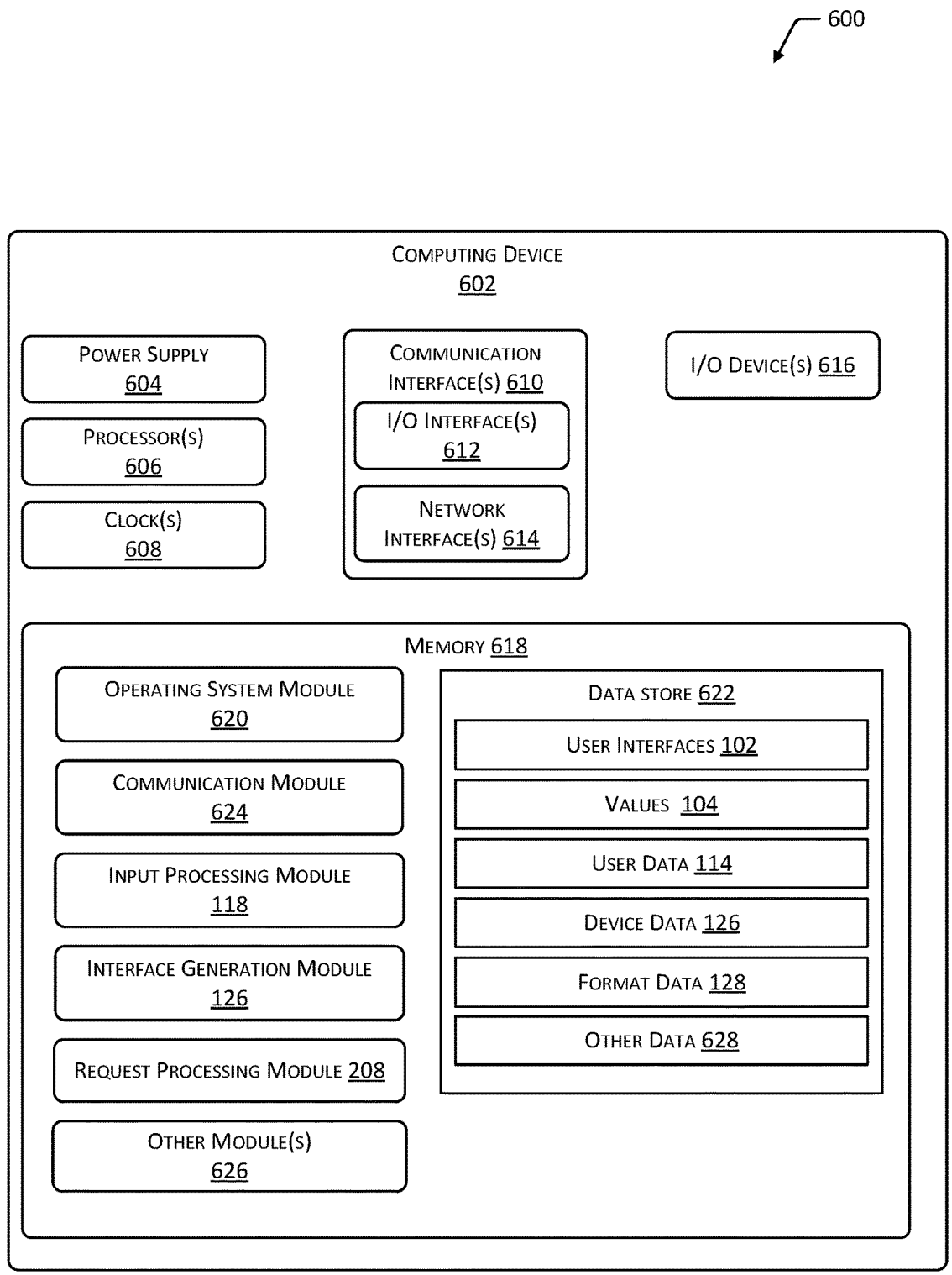
FIG. 6 is a block diagram illustrating a computing device within the present disclosure.

FIG. 6 is a block diagram 600 illustrating a computing device 602 within the present disclosure. In some implementations, the computing device 602 may include one or more interface servers 110 or other computing devices 602 in communication with an interface server 110. In other implementations, the computing device 602 may include one or more user devices 106 or other computing devices 602 in communication with a user device 106. While FIG. 6 depicts a single block diagram 600 representative of a computing device 602, any number of networked computing devices 602 may perform the implementations described herein.

One or more power supplies 604 may be configured to provide electrical power suitable for operating the components of the computing device 602. In some implementations, the power supply 604 may include a rechargeable battery, fuel cell, photovoltaic cell, power conditioning circuitry, and so forth.

The computing device 602 may include one or more hardware processor(s) 606 (processors) configured to execute one or more stored instructions. The processor(s) 606 may include one or more cores. One or more clock(s) 608 may provide information indicative of date, time, ticks, and so forth. For example, the processor(s) 606 may use data from the clock 608 to generate a timestamp, trigger a preprogrammed action, and so forth.

The computing device 602 may include one or more communication interfaces 610, such as input/output (I/O) interfaces 612, network interfaces 614, and so forth. The communication interfaces 610 may enable the computing device 602, or components of the computing device 602, to communicate with other computing devices 602 or components of the other computing devices 602. The I/O interfaces 612 may include interfaces such as Inter-Integrated Circuit (I2C), Serial Peripheral Interface bus (SPI), Universal Serial Bus (USB) as promulgated by the USB Implementers Forum, RS-232, and so forth.

The I/O interface(s) 612 may couple to one or more I/O devices 616. The I/O devices 616 may include any manner of input device or output device associated with the computing device 602. For example, I/O devices 616 may include touch sensors, keyboards, mouse devices, microphones, image sensors (e.g., cameras), scanners, displays, speakers, haptic devices, printers, weight sensors, code reading devices, RFID devices, NFC devices, and so forth. In some implementations, the I/O devices 616 may be physically incorporated with the computing device 602 or may be externally placed.

The network interfaces 614 may be configured to provide communications between the computing device 602 and other devices, such as the I/O devices 616, routers, access points, and so forth. The network interfaces 614 may include devices configured to couple to one or more networks including local area networks (LANs), wireless LANs (WLANs), wide area networks (WANs), wireless WANs, and so forth. For example, the network interfaces 614 may include devices compatible with Ethernet, Wi-Fi, Bluetooth, ZigBee, Z-Wave, 3G, 4G, LTE, and so forth.

The computing device 602 may include one or more busses or other internal communications hardware or software that allows for the transfer of data between the various modules and components of the computing device 602.

As shown in FIG. 6, the computing device 602 may include one or more memories 618. The memory 618 may include one or more computer-readable storage media (CRSM). The CRSM may be any one or more of an electronic storage medium, a magnetic storage medium, an optical storage medium, a quantum storage medium, a mechanical computer storage medium, and so forth. The memory 618 may provide storage of computer-readable instructions, data structures, program modules, and other data for the operation of the computing device 602. A few example modules are shown stored in the memory 618, although the same functionality may alternatively be implemented in hardware, firmware, or as a system on a chip (SoC).

The memory 618 may include one or more operating system (OS) modules 620. The OS module 620 may be configured to manage hardware resource devices such as the I/O interfaces 612, the network interfaces 614, the I/O devices 616, and to provide various services to applications or modules executing on the processors 606. The OS module 620 may implement a variant of the FreeBSD operating system as promulgated by the FreeBSD Project; UNIX or a UNIX-like operating system; a variation of the Linux operating system as promulgated by Linus Torvalds; the Windows operating system from Microsoft Corporation of Redmond, Wash., USA; or other operating systems.

One or more data stores 622 and one or more of the following modules may also be associated with the memory 618. The modules may be executed as foreground applications, background tasks, daemons, and so forth. The data store(s) 622 may use a flat file, database, linked list, tree, executable code, script, or other data structure to store information. In some implementations, the data store(s) 622 or a portion of the data store(s) 622 may be distributed across one or more other devices including other computing devices 602, network attached storage devices, and so forth.

A communication module 624 may be configured to establish communications with one or more other computing devices 602. Communications may be authenticated, encrypted, and so forth.

The memory 618 may also store the input processing module 118. The input processing module 118 may receive user input 108 and requests 202 from other computing devices 602. Based on value identifiers 112 associated with the user input 108 or indications of content to be accessed associated with request data 204, the input processing module 118 may determine whether user input 108 or requests 202 correspond to existing values 104. Based on received user input 108, the input processing module 118 may generate interface data 120 that includes value identifiers 112 indicative of the values 104 associated with the user input 108. The input processing module 118 may also determine user data 114 and device data 116 from the user input 108, or in some implementations, from the user device 106 or other data sources. Based on the user data 114, the input processing module 118 may determine one or more user identifiers 122 indicative of a user, user device 106, user account, or user account characteristic. Based on the device data 116, the input processing module 118 may determine one or more device characteristics 124, such as display or audio output capabilities of a computing device 602. Similarly, the input processing module 118 may also determine user data 114 and device data 116 associated with requests 202 and determine request characteristics 206 such as user identifiers 122 and device characteristics 124 associated with the request 202.

The memory 618 may additionally store the interface generation module 126. The interface generation module 126 may generate a user interface 102 based on value identifiers 112 determined from user input 108 or from one or more default sets of values 104. The interface generation module 126 may access format data 128, which may associate device characteristics 124, such as dimensions or shapes of display areas, with corresponding counts and arrangements of elements. For example, a user interface 102 for presentation using a round display may include a different arrangement of elements than a user interface for presentation using a rectangular display. Based on the format data 128 and the interface data 120, the interface generation module 126 may generate a user interface 102 that includes the values 104 associated with the value identifiers 112 having a format that corresponds to the device characteristics 124. In some implementations, user input 108 may also be used to determine the manner in which elements within a user interface 102 are arranged. For example, a user may indicate an order or position of one or more elements. The generated user interface 102 may be stored in association with corresponding user identifiers 122 and device characteristics 124. When a request 202 to access content is received, a particular user interface 102 having a user identifier 122 that corresponds to the user account associated with the request 202 or device characteristics 124 that correspond to the computing device 602 providing the request 202 may be transmitted to the computing device 602 in response to the request 202.

The memory 618 may further store the request processing module 208. The request processing module 208 may determine a user interface 102 to be provided to a computing device 602 in response to a request 202 and a current status for each value 104 included in the user interface 102. For example, the request processing module 208 may determine correspondence between the user identifiers 122 and device characteristics 124 associated with existing user interfaces 102 and the user identifier 122 and device characteristics 124 of a received request 202. A user interface 102 associated with a corresponding user identifier 122 and device characteristics 124 may include values 104 associated with a particular user account that are arranged based on the characteristics of the computing device 602 providing the request 202. In addition to do determining a user interface 102 that corresponds to the user account and computing device 602 associated with the request 202, the request processing module 208 may determine the current status of each value 104 included in the user interface 102 and may provide an indication of each status to the computing device 602 for presentation in the user interface 102.

Other modules 626 may also be present in the memory 618. For example, encryption modules may be used to encrypt and decrypt communications between computing devices 602. Authentication modules may be used to authenticate communications sent or received by computing devices 602. Other modules 626 may also include modules for detecting characteristics of a computing device 602, such as characteristics of a display, audio output device, browser or other application, and so forth.

Other data 628 within the data store(s) 622 may include configurations, settings, preferences, and default values associated with computing devices 602. Other data 628 may include encryption keys and schema, access credentials, and so forth.

In different implementations, different computing devices 602 may have different capabilities or capacities. For example, interface servers 110 may have greater processing capabilities or data storage capacity than user devices 106.

Figure 7:
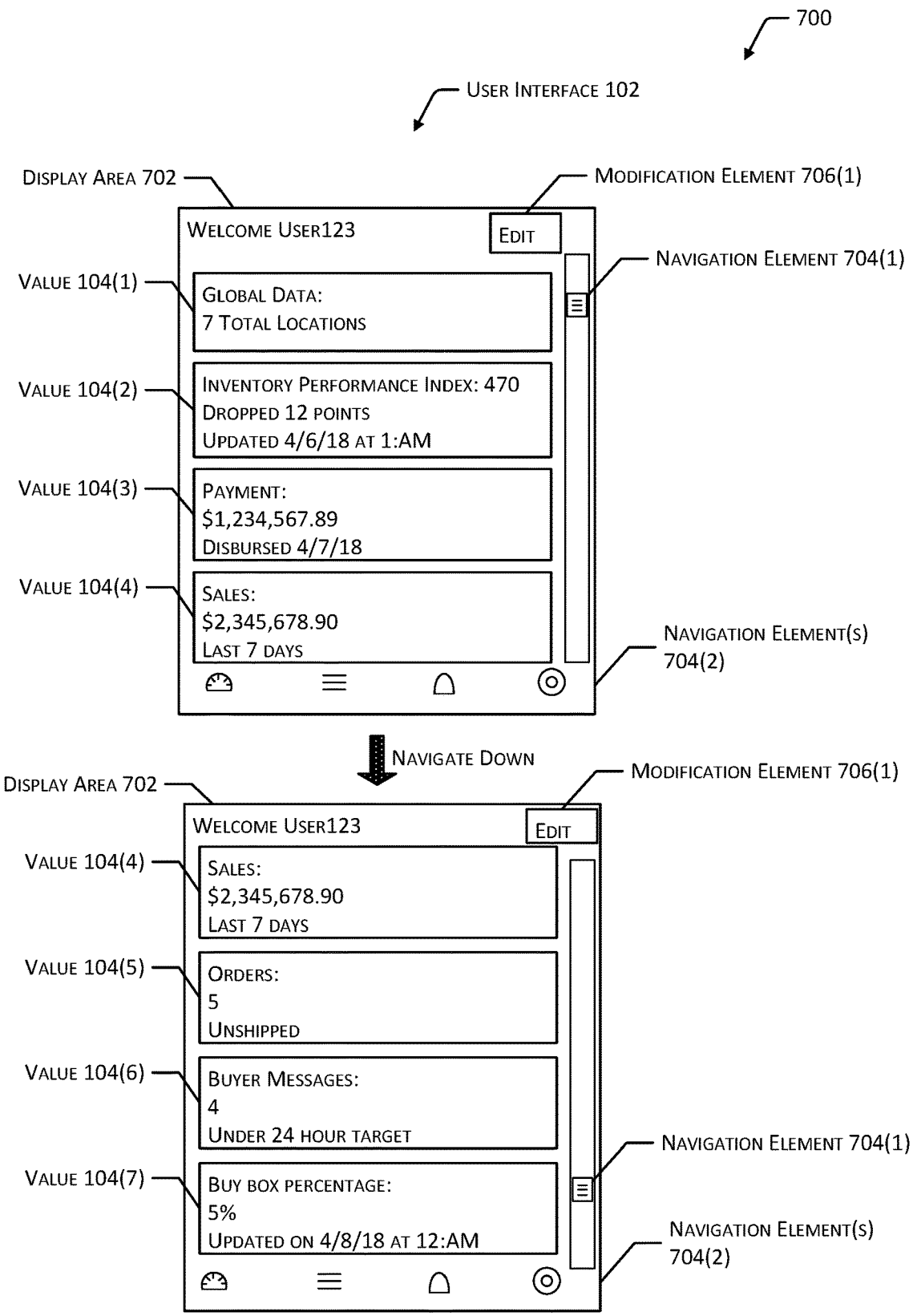
FIG. 7 is a diagram illustrating an example user interface within the present disclosure.

FIG. 7 is a diagram 700 illustrating an example user interface 102 within the present disclosure. The example user interface 102 is shown having a generally rectangular shape with elements arranged in a vertical column, that is sized to be presented within a display area 702 of a user device 106. In other implementations, a user interface 102 may have other dimensions, shapes, or arrangements of elements. In some implementations, the user interface 102 may include content that extends beyond the display area 702 that may be accessed by interacting with a navigation element 704. FIG. 7 depicts a first example navigation element 704(1) as a vertical scroll bar. In other implementations, navigation between portions of a user interface 102 may be performed by scrolling horizontally, by switching or navigating through pages, and so forth. FIG. 7 also depicts second example navigation elements 704(2) that may be used to select pages or other areas of a user interface 102 for navigation, to modify settings associated with the user interface 102, to view notifications associated with the user interface 102, and so forth.

The user interface 102 is shown presenting seven values 104 in the form of "cards" within a card-based user interface 102. For example, each value 104 or a set of related values 104 may be included within a single card, and the cards may be arranged in a grid, list, or other arrangement that corresponds to the size and shape of the display area 702. Cards may be individually accessed, updated, modified, and so forth. As shown in FIG. 7, a first portion of the values 104 is visible prior to interacting with a navigation element 704, while a second portion of the values 104 is visible subsequent to interacting with a navigation element 704 to change the portion of the user interface 102 that is visible in the display area 702. FIG. 7 depicts a first example value 104(1) as a performance indicator relating to a count of total countries or stores in which an item is sold. A second value 104(2) is shown as an inventory performance index. The second value 104(2) also indicates a quantity by which the value 104(2) has changed over a period of time and a date and time at which the current status of the value 104(2) was updated. A third value 104(3) is shown as a quantity of payment associated with an item, and also indicates a date at which the current status of the value 104(3) was updated. A fourth value 104(4) is shown as a quantity of sales revenue associated with an item and a time period during which the quantity occurred. A fifth value 104(5) is shown as a quantity of orders for an item and an indication regarding the shipment status of the orders. A sixth value 104(6) is shown as a quantity of buyer messages received with regard to an item and an indication of a status regarding whether the messages have been responded to within twenty-four hours of receipt. A seventh value 104(7) indicates a buy box percentage indicative of a rate at which an item for the user associated with the user interface 102 is available for purchase using an online store. A modification element 706(1) may be used to modify the particular values 104 that are presented or the arrangement of the values 104.

Figure 8:
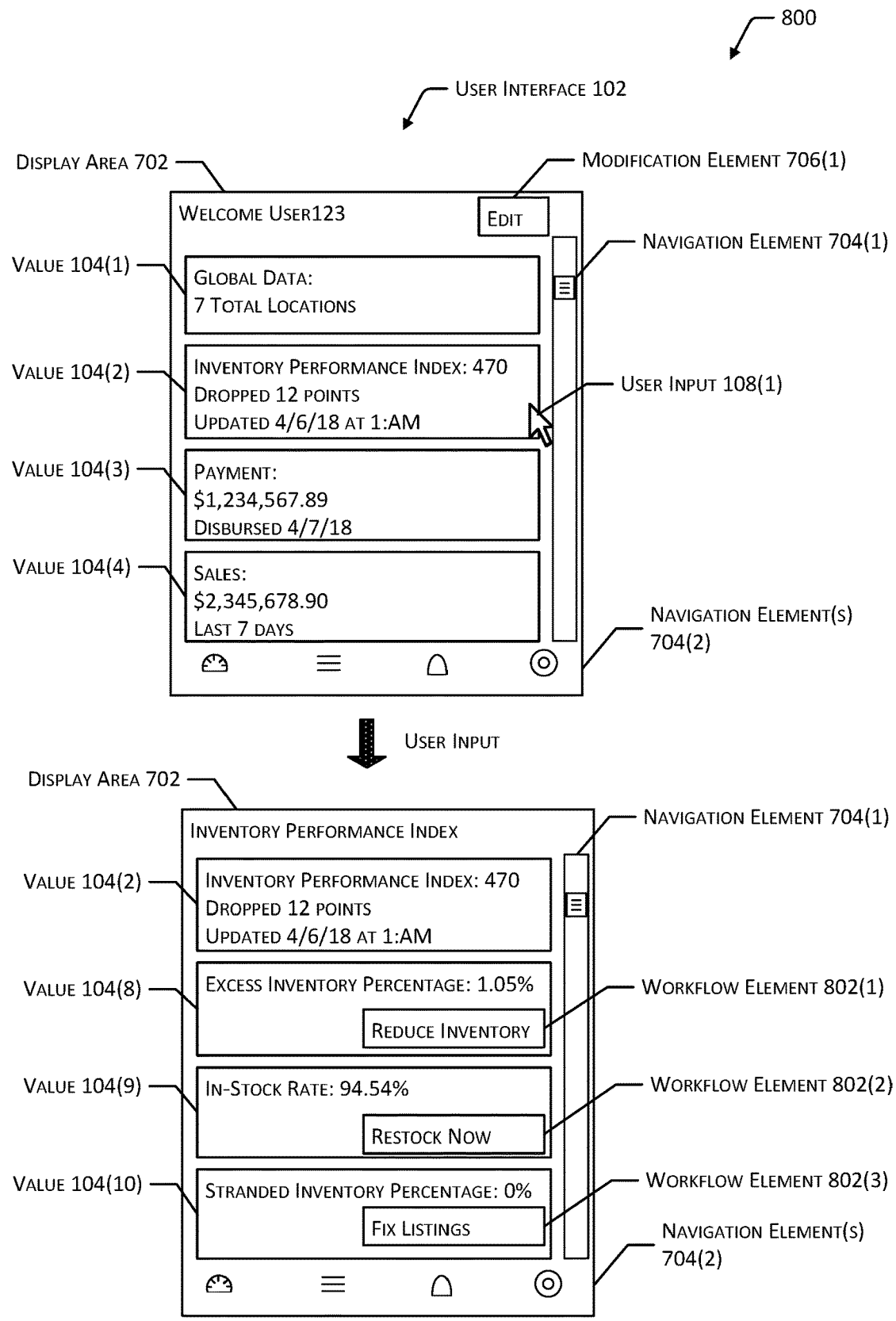
FIG. 8 is a diagram illustrating an example user interface within the present disclosure.

FIG. 8 is a diagram 800 illustrating an example user interface 102 within the present disclosure. As described with regard to FIG. 7, a user interface 102 may be sized to occupy a display area 702 of a user device 106, and different portions of the user interface 102 may be viewed in the display area 702 by accessing a navigation element 704. Additionally, in some implementations, user input 108(1) may be provided to indicate a particular value 104(2) presented in the user interface 102. In response to the user input 108(1) a user interface 102 presenting values 104 related to the particular value 104(2) may be presented in the display area 702. For example, FIG. 8 depicts user input 108(1) indicating the second value 104(2), representing an Inventory Performance Index. In response to the user input 108, a user interface 102 may be provided to the display area 702 that presents the second value 104(2) and one or more other values 104 that are related to the second value 104(2). Specifically, FIG. 8 depicts an eighth value 104(8) indicating an Excess Inventory Percentage of 1.05%, a ninth value 104(9) indicating an In-Stock Rate of 94.54%, and a tenth value 104(10) indicating a Stranded Inventory Percentage of 0%. The eighth value 104(8), ninth value 104(9), and tenth value 104(10) also each include a workflow element 802 that may be used to initiate a workflow process to modify one or more values 104. For example, a first workflow element 802(1) positioned proximate to the eighth value 104(8) is shown as a button that may be used to initiate a workflow process reduce a quantity of inventory. A second workflow element 802(2) positioned proximate to the ninth value 104(9) is shown as a button that may be used to initiate a workflow process to restock inventory. A third workflow element 802(3) positioned proximate to the tenth value 104(10) is shown as a button that may be used to initiate a workflow process to modify item listings. As such, user input 108 provided to a user interface 102 may be used to access values 104 not currently visible in the user interface 102 or to initiate a workflow process to modify one or more values 104.

Figure 9:
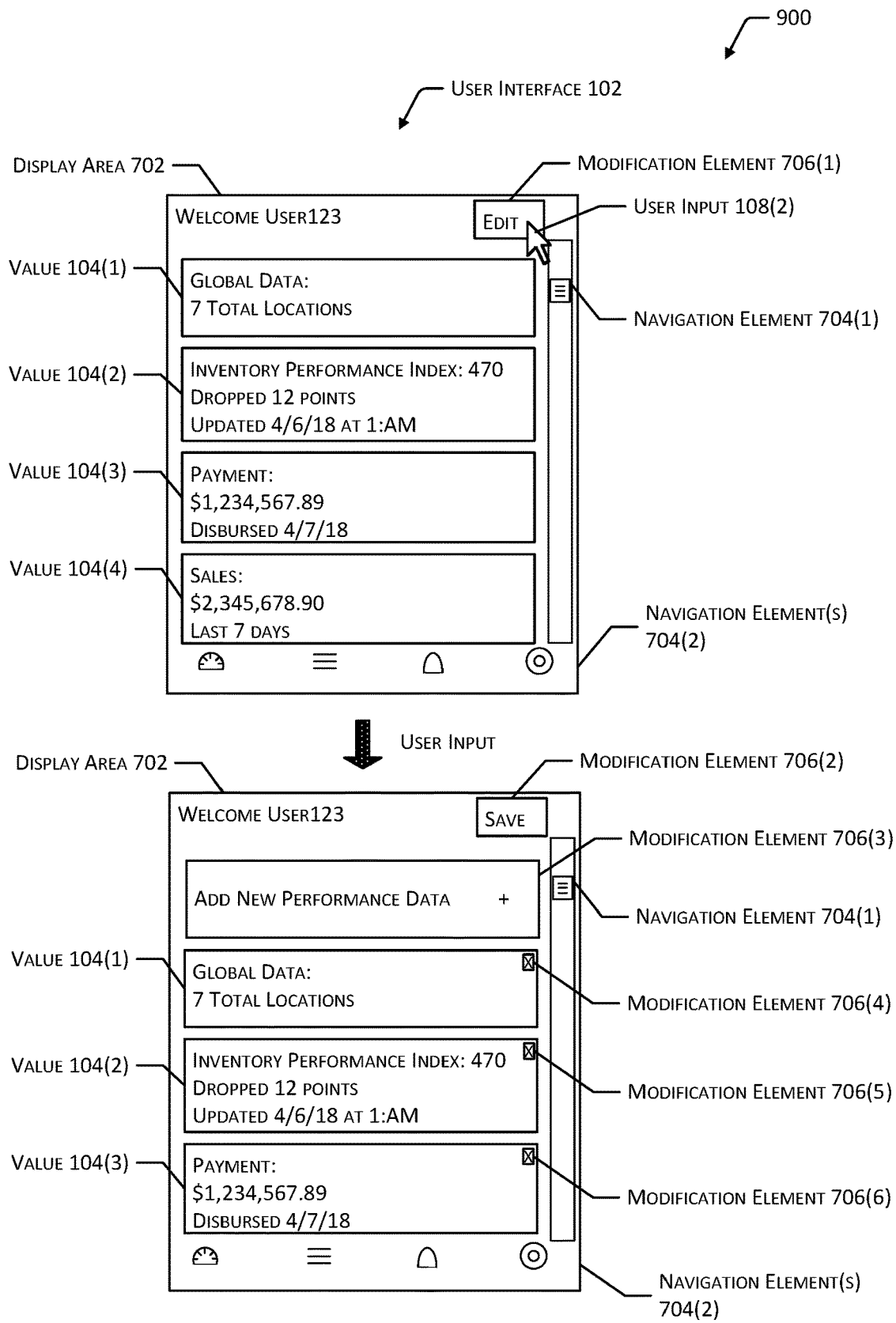
FIG. 9 is a diagram illustrating an example user interface within the present disclosure.

FIG. 9 is a diagram 900 illustrating an example user interface 102 within the present disclosure. As described with regard to FIG. 7, a user interface 102 may be sized to occupy a display area 702 of a user device 106, and different portions of the user interface 102 may be viewed in the display area 702 by accessing a navigation element 704. Additionally, a modification element 706(1) may be used to add or remove values 104 from the user interface 102 or to modify an arrangement of the values 104. For example, FIG. 9 depicts user input 108(2) provided to a first modification element 706(1), depicted as an "edit" button configured to enable subsequent user input 108 to add, remove, or change the arrangement of the values 104. Subsequent to providing user input 108(2) to the modification element 706(1) a user interface 102 that includes additional modification elements 706 may be presented in the display area 102.

Specifically, FIG. 9 depicts an example user interface 102 that includes a second modification element 706(2) that may be used to save and complete one or more modifications made to the user interface 102. Additionally, a third modification element 706(3) may be used to add an additional value 104 to the user interface 104. For example, providing user input 108 to the third modification element 706(3) may result in presentation of a list, menu, or other interface for selecting one or more additional values 104 to be included in the user interface 102. Further, a fourth modification element 706(4) proximate to the first value 104(1) may be used to remove the first value 104(1) from the user interface 102, a fifth modification element 706(5) proximate to the second value 104(2) may be used to remove the second value 104(2) from the user interface 102, and a sixth modification element 706(6) proximate to the third value 104(3) may be used to remove the third value 104(3) from the user interface 102.

Figure 10:
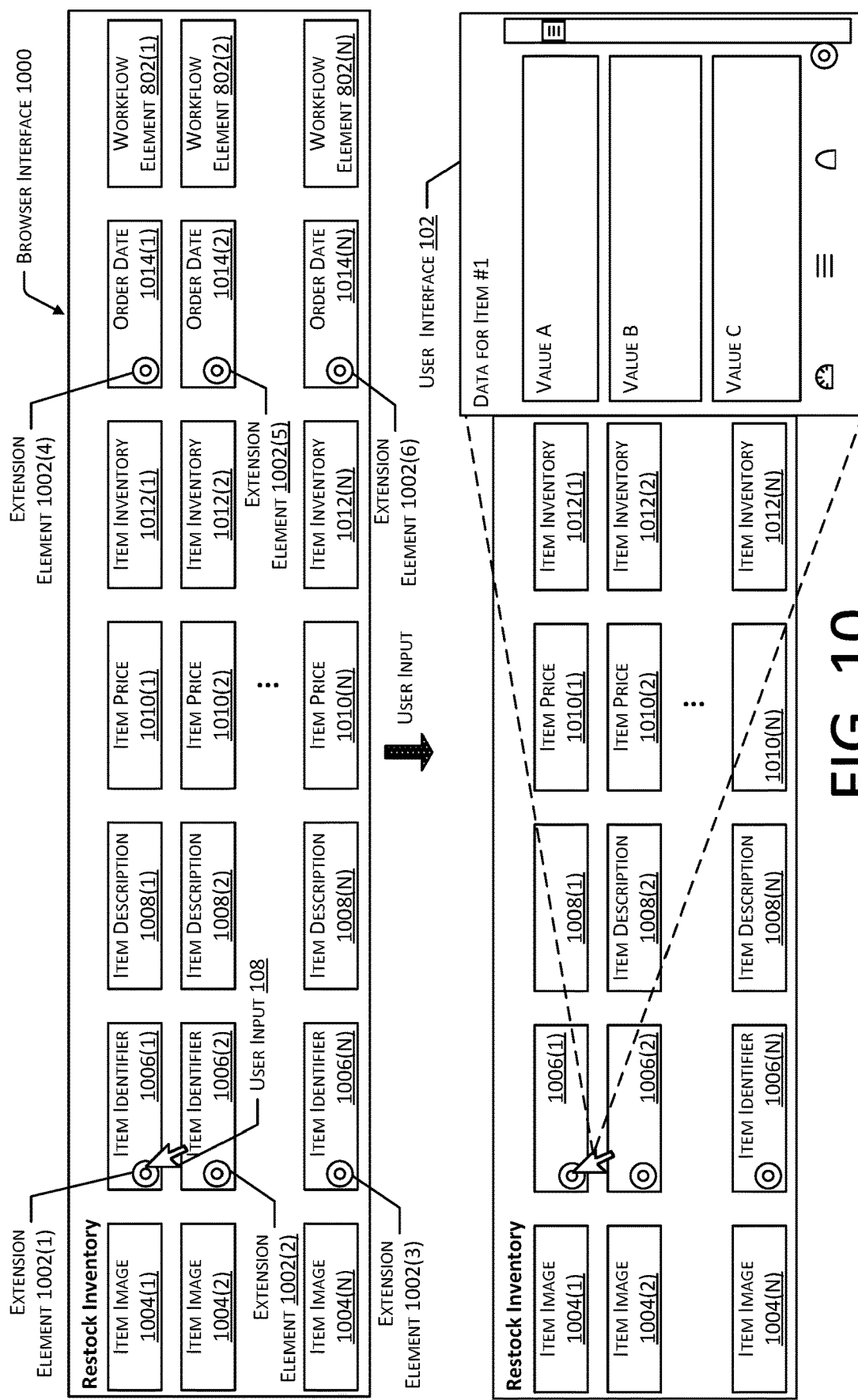
FIG. 10 depicts an implementation of a browser interface through which one or more user interfaces may be accessed, or one or more workflow processes may be initiated, through the addition of extension elements on an existing webpage.

FIG. 10 depicts an implementation of a browser interface 1000 from which one or more user interfaces 102 may be accessed, or one or more workflow processes may be initiated, through the addition of extension elements 1002 on an existing webpage. The example browser interface 1000 shown in FIG. 10 includes a webpage that may be used to restock inventory for one or more items. Specifically the browser interface 1000 depicts information regarding particular items, arranged in rows, the information including an item image 1004, an item identifier 1006 such as a stock keeping unit (SKU) or similar method for differentiating one item from another, an item description 1008 such as an item name or other data indicative of item characteristics, and an item price 1010. The browser interface 1000 may also indicate a quantity of item inventory 1012 currently in stock, which may be expressed as a quantity of units, a quantity of days of inventory left based on a rate of sales, and so forth. The browser interface 1000 may further include an order date 1014 for each item, indicating a date on which inventory for an item will be restocked or a date on which restocking inventory is recommended. In some implementations, the browser interface 1000 may also include one or more workflow elements 802. For example, a workflow element 802 may include a button or other type of element for initiating a workflow process to restock inventory associated with an item or to navigate to a user interface 102 for receiving information for restocking inventory.

In some implementations, one or more user interfaces 102, such as those described with regard to FIGS. 7 through 9, may be accessible via a browser interface 1000, such as through use of a browser extension. For example, a browser extension may cause one or more extension elements 1002 to be output with the browser interface 1000. Each extension element 1002 may cause output of a user interface 102 or initiation of a workflow process in response to user input 108. For example, FIG. 10 depicts a first set of extension elements 1002 positioned in association with the item identifiers 1006 for each item and a second set of extension elements 1002 positioned in association with the order date 1014 for each item.

Continuing the example, user input 108 associated with a first extension element 1002(1) displayed in association with a first item identifier 1006(1) may be used to access a user interface 102 that presents values 104 associated with an item that corresponds to the first item identifier 1006(1). User input 108 may include selection of the element extension 1002(1), such as through use of a keyboard, mouse device, or touch interface, or positioning a cursor or touch at or near the extension element 1002(1). In response to the user input 108, FIG. 10 depicts an example user interface 102 showing values 104 associated with the item that corresponds to the first item identifier 1006(1). While FIG. 10 depicts the user interface 102 presented over a portion of the browser interface 1000, in other implementations, the user interface 102 may be presented in a separate portion of a display area 702 not occupied by the browser interface 1000 or on a separate device. Interaction with the second set of extension elements 1002 associated with the order dates 1014 may be used to configure a notification to be provided to a user device 106 or user interface 102, such as a reminder to initiate a workflow process to restock inventory. For example, a notification may be configured for output when a value 104 associated with the item inventory 1012 for an item is at or below a threshold value. As such, a user interface 102 may be accessed by providing user input 108 to an extension element 1002 without navigating away from the browser interface 1000. Additionally, through use of extension elements 1002 functionality that is not present in the browser interface 1000 itself may be added, such as through use of a browser extension plug-in. In some cases, the additional functionality may include functions that are not able to be performed using the browser interface 1000 itself. In other cases, the additional functionality may include use of a single extension element 1002 to perform a task or series of tasks that would typically require navigation through multiple webpages.

Figure 11:
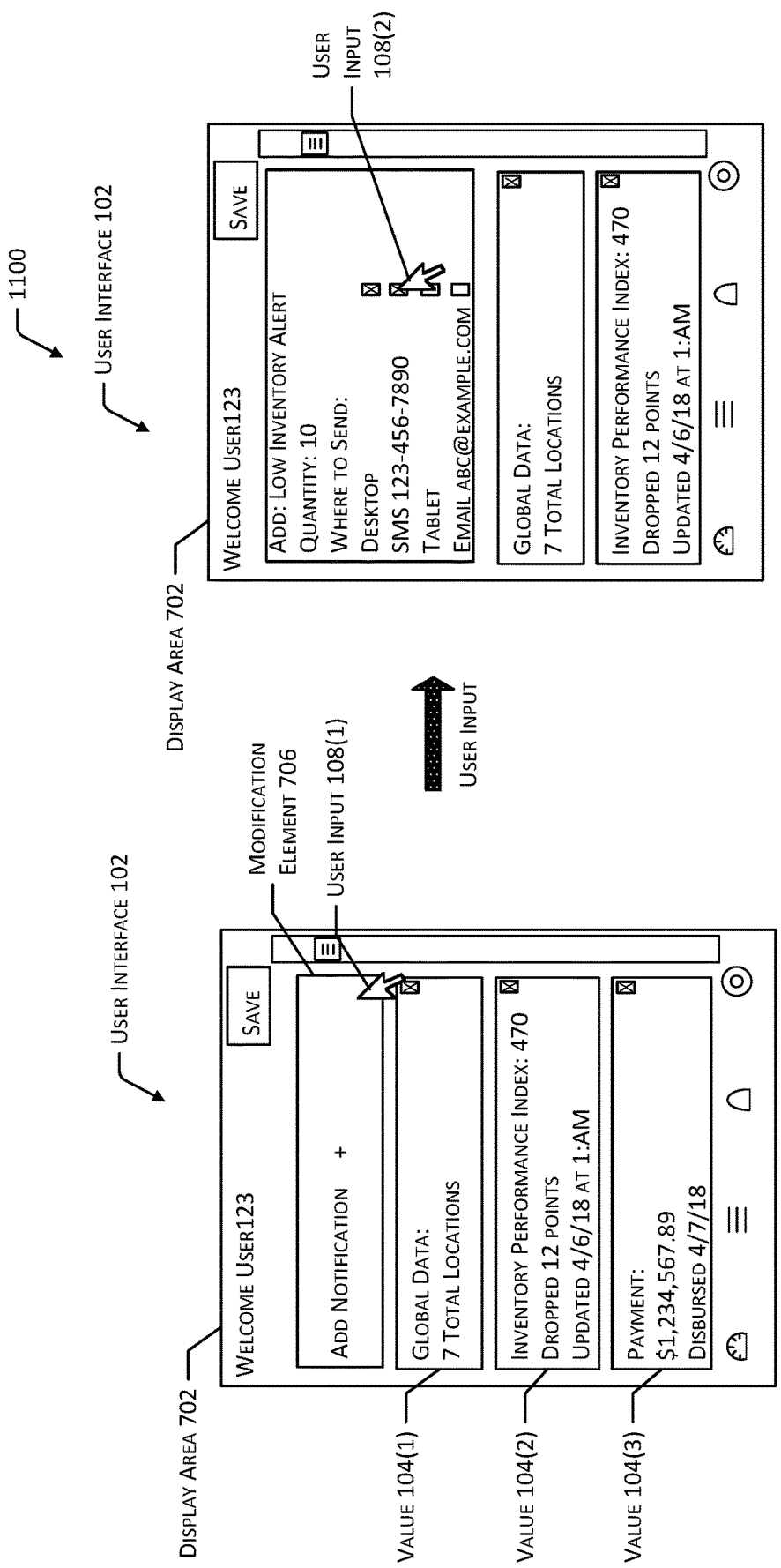
FIG. 11 is a diagram illustrating an example user interface that includes a modification element for causing output of a notification.

FIG. 11 is a diagram 1100 illustrating an example user interface 102 that includes a modification element 706 for causing output of a notification. As described previously, in some implementations, user input 108 indicating a threshold condition for a particular value 104 may be received, and a notification may be provided to the user interface 102 if a value 104 deviates from a threshold condition. For example, if a quantity of inventory associated with an item available for purchase falls below a threshold quantity, a notification to restock the inventory associated with the item may be presented. FIG. 11 depicts the user interface 102 including a modification element 706 that, in response to user input 108(1), may present a region within the user interface 102 for receiving additional user input 108(2) to configure a notification. Specifically, user input 108(2) may be used to select a type of notification, such as a "low inventory alert", to enter a threshold condition such as a quantity of inventory that will trigger presentation of the notification, and one or more devices or services that may be used to present the notification. For example, FIG. 11 depicts the user input 108(2) indicating a threshold quantity of ten and selectable options for presentation of the notification using a desktop computer, such as via a browser interface 1000, to a tablet computer, via SMS, or via e-mail. In some implementations, the notification may be configured for output as audio. For example, in addition to or in place of a visible notification, a notification may be output using speakers associated with a device, or in some cases, the device used to output the notification may lack a display. For example, a networked speaker device may provide an audio cue indicating when a notification is available, and in response to voice input requesting to access the notification, the notification may be output as audio. In some cases, devices may include visual indicators, such as one or more lights or similar features, that may be used to indicate that a notification is available. When a notification is generated, it may be provided to all devices and media selected by a user, unless a particular device or medium is indicated as unavailable for receiving notifications, such as using a "do not disturb" mode. When a notification is accessed by a user and acted upon using a single device, such as by dismissing or modifying the notification, this action may be promulgated to each device, such that when accessing a different device at a later time, the notification may remain dismissed or modified.

Figure 12:
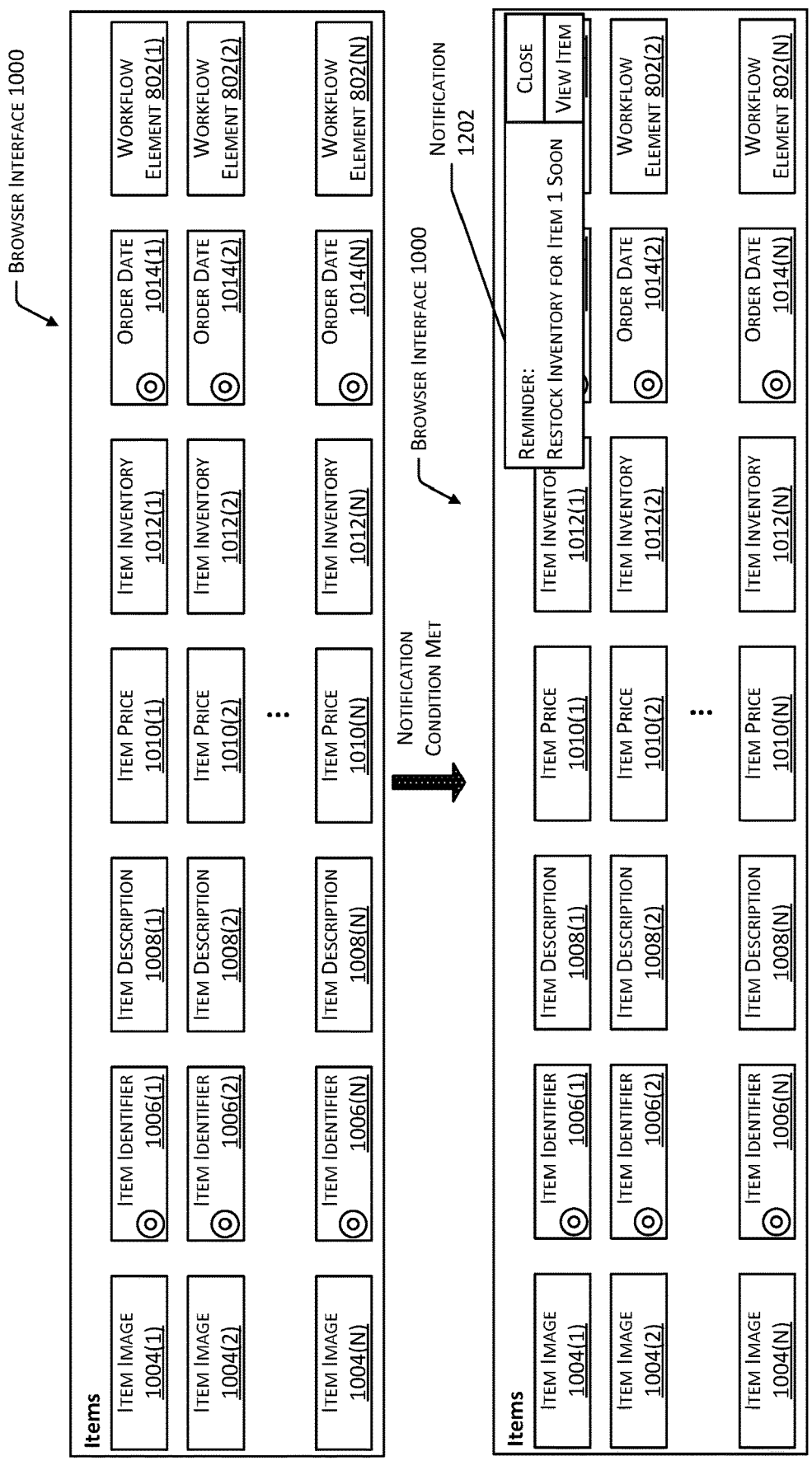
FIG. 12 depicts an implementation of a browser interface through which a configured notification may be presented.

FIG. 12 depicts an implementation of a browser interface 1000 through which a configured notification 1202 may be presented. As described with regard to FIG. 10, a browser interface 1000 may present data regarding particular items including, in some implementations, a quantity of item inventory 1012 representative of a quantity of inventory for a particular item that is currently in stock. As described with regard to FIG. 11, one type of notification may include a "low inventory alert" that may be presented if an item inventory 1012 quantity is less than or equal to a threshold quantity indicated via user input 108(2) used to configure the notification 1202. If the threshold condition associated with a notification 1202 is met, the notification 1202 may be presented in the browser interface 1000. For example, FIG. 12 depicts the notification 1202 superimposed over a portion of the browser interface 1000. In other implementations, the notification 1202 may be presented in a portion of a display area 702 not occupied by other data, such as a region of the browser interface 1000 adjacent to existing data. In still other implementations, a notification 1202 may be presented using audio, in addition to or in place of a visual presentation of the notification 1202. In some implementations, the notification 1202 may include buttons or other types of regions for receiving user input 108 that may be used to permanently or temporarily dismiss the notification 1202, and a region for initiating a workflow process, such as restocking of an item or navigating to a user interface 102 that may be used to initiate a restocking process or other type of workflow process.

While FIG. 12 depicts the notification 1202 being presented when the browser interface 1000 is accessed, such as via a "push" method for presenting the notification 1202, in other implementations, notifications 1202 may be displayed and accessed when a user accesses a user interface 102. For example, presented notifications 1202 may be included in the user interface 102 as a value 104.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described in this disclosure. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
   one or more memories storing computer-executable instructions; and
   one or more hardware processors to execute the computer-executable instructions to:
      access seller data indicative of a plurality of performance indicators associated with sales of one or more types of items;
      receive first user input indicating a subset of the plurality of performance indicators;
      generate a first user interface that presents the subset of the plurality of performance indicators, wherein the first user interface is associated with a first characteristic of a display device, and one or more performance indicators of the subset are selectable to one or more of:
         directly access at least one other performance indicator of the plurality of performance indicators, or
         launch a workflow process to modify a performance indicator of the plurality of performance indicators;
      receive a first request from a first user device to access the subset of the plurality of performance indicators;
      determine correspondence between the first characteristic and a second characteristic of the first user device;
      determine, based on the seller data, one or more values for the subset of the plurality of performance indicators;
      provide the first user interface and the one or more values to the first user device;
      receive, from the first user device, second user input indicating a first performance indicator of the subset of the plurality of performance indicators;
      in response to the second user input, determine a portion of the seller data associated with the first performance indicator;
      generate an output indicative of the portion of the seller data; and
      provide the output to the first user device.

2. The system of claim 1, further comprising computer-executable instructions to:
   receive third user input indicating a threshold condition for the first performance indicator;
   determine that a value for the first performance indicator deviates from the threshold condition;
   generate a notification indicative of the first performance indicator; and
   provide the notification to one or more of the first user device or a second user device.

3. The system of claim 1, further comprising computer-executable instructions to:
   in response to the second user input, initiate a workflow process to modify a value for the first performance indicator.

4. The system of claim 1, further comprising computer-executable instructions to:
   generate a second user interface that presents the subset of the plurality of performance indicators, wherein the second user interface is associated with a third characteristic of an output device;
   modify at least a portion of the second user interface based on the first user input;
   receive a second request from a second user device to access the subset of the plurality of performance indicators;
   determine correspondence between the third characteristic and a fourth characteristic of the second user device; and
   provide the second user interface to the second user device.

5. A system comprising:
   one or more memories storing computer-executable instructions; and
   one or more hardware processors to execute the computer-executable instructions to:
      access a plurality of values;
      generate a first user interface that presents a first subset of the plurality of values, wherein:
         the first user interface is associated with a first device characteristic indicative of one or more of: display dimensions, display shapes, or audio output characteristics,
         the first user interface is further associated with user data indicative of one or more of: a user identifier, user input indicating the first subset, or user permissions indicating access to the first subset, and
         one or more values of the first subset are selectable to one or more of access at least one other value of the plurality of values or initiate a workflow process to modify a value of the plurality of values;
      receive a request from a user device having a second device characteristic indicative of one or more of: a dimension of a display of the user device, a shape of the display, or an audio output characteristic of the user device, wherein the request is associated with the user identifier and the user permissions;
      determine correspondence between the first device characteristic and the second device characteristic;
      determine correspondence between the user identifier and the user permissions associated with the request and the user data associated with the first user interface;

determine the first subset of the plurality of values; and
provide the first user interface and the first subset of the plurality of values to the user device, wherein the first user interface includes one or more of: a count of elements or an arrangement of elements that corresponds to the one or more of the dimension of the display, the shape of the display, or the audio output characteristic of the user device.

6. The system of claim 5, further comprising computer-executable instructions to:
cause the user device to output a browser interface that includes one or more extension elements; and
receive user input indicating an extension element of the one or more extension elements, wherein the first user interface is provided to the user device in response to the user input indicating the extension element, and the first user interface is presented without navigating away from a webpage presented using the browser interface.

7. The system of claim 5, further comprising computer-executable instructions to:
receive first user input indicating a threshold condition associated with a value of the plurality of values;
determine that the value deviates from the threshold condition;
provide a notification indicative of the value to a browser interface associated with the user device, wherein the notification includes a link; and
receive second user input selecting the link, wherein the first user interface is provided to the user device in response to the second user input.

8. The system of claim 5, further comprising computer-executable instructions to:
determine one or more of the display dimensions or the display shape associated with the user device based on the second device characteristic; and
determine a count of values based on the one or more of the display dimensions or the display shape, wherein the first subset of the plurality of values includes the count of values.

9. The system of claim 5, further comprising computer-executable instructions to:
receive first user input indicating a threshold condition associated with a value of the plurality of values;
determine that the value deviates from the threshold condition;
generate a notification indicative of the value; and
include an indication of the notification in the first user interface.

10. The system of claim 9, further comprising computer-executable instructions to:
receive second user input modifying the notification to form a modified notification;
generate a second user interface associated with a third device characteristic;
receive a request associated with the third device characteristic; and
provide the second user interface in response to the request associated with the third device characteristic, wherein the second user interface includes the modified notification.

11. The system of claim 5, further comprising computer-executable instructions to:
receive user input indicating a value of the first subset of the plurality of values;
determine one or more processes associated with modification of the value; and
execute the one or more processes in response to the user input.

12. The system of claim 5, further comprising computer-executable instructions to:
receive user input indicating a first value of the first subset of the plurality of values;
determine one or more second values of the plurality of values that are not included in the first subset;
generate a second user interface that presents the one or more second values; and
provide the second user interface to the user device.

13. A method comprising:
accessing a first set of values;
generating a first user interface that includes the first set of values, wherein the first user interface is associated with a first device characteristic;
determining a subset of the first set of values for inclusion in a second user interface associated with a second device characteristic;
generating the second user interface that includes the subset of the first set of values;
receiving a first request from a first user device;
determining a third device characteristic of the first user device;
determining correspondence between the third device characteristic and the second device characteristic;
based on the third device characteristic, determining one or more of a count of elements or an arrangement of elements;
based on the correspondence, determining the subset of the first set of values; and
providing the second user interface and the subset of the first set of values to the first user device, wherein the second user interface includes the one or more of the count of elements or the arrangement of elements.

14. The method of claim 13, further comprising:
receiving user input indicating the first set of values;
determining first user data based on the user input, wherein the first user data indicates an account associated with the user input, and the first user interface and the second user interface are associated with the account; and
determining that second user data associated with the first request corresponds to the first user data, wherein the second user interface is provided to the first user device in response to the determining that the second user data corresponds to the first user data.

15. The method of claim 13, further comprising:
based on format data that associates the second device characteristic with an element for initiating a workflow process, including the element in the second user interface;
receiving user input indicating the element of the second user interface; and
in response to the user input, initiating the workflow process to modify a value of the subset of the first set of values that is associated with the element.

16. The method of claim 13, wherein the third device characteristic includes one or more of a size or a shape of a display area associated with the first user device, the method further comprising:
determining the one or more of the count of elements or the arrangement of elements based in part on the one or more of the size or the shape.

17. The method of claim 13, wherein the third device characteristic includes an indication of an audio output device, and generating the second user interface includes generating audio data configured to output the subset of the first set of values as audio.

18. The method of claim 13, further comprising:

receiving user input modifying a value of the subset of the first set of values to form a modified value;

receiving a second request from a second user device;

determining a fourth device characteristic of the second user device;

determining correspondence between the fourth device characteristic and the first device characteristic; and providing the first user interface and the first set of values to the second user device, wherein the first set of values includes the modified value and the first user interface includes one or more of a count of elements or an arrangement of elements that corresponds to the fourth device characteristic.

19. The method of claim 13, further comprising:

based on format data that associates the second device characteristic with an element to initiate a first workflow process, including the element in the second user interface;

receiving user input indicating a value of the subset of the first set of values;

determining that a characteristic of the first workflow process exceeds a threshold value; and in response to the user input and to the characteristic of the first workflow process exceeding the threshold value, providing a third user interface to the first user device, wherein the third user interface is configured to receive data from the first user device to initiate a second workflow process for modifying the value.

20. The method of claim 13, further comprising:

determining that a value of the first set of values that is not included in the subset of the first set of values deviates from a threshold condition; and providing a notification indicative of the value to the first user device.

* * * * *